US012771585B2

(12) United States Patent
Li et al.

(10) Patent No.: US 12,771,585 B2
(45) Date of Patent: Oct. 20, 2026

(54) SYNCHRONIZATION SIGNAL BLOCK ENHANCEMENT FOR ADDITIONAL NUMEROLOGIES

(71) Applicant: QUALCOMM Incorporated, San Diego, CA (US)

(72) Inventors: Qiaoyu Li, Beijing (CN); Chao Wei, Beijing (CN); Hao Xu, Beijing (CN); Chenxi Hao, Beijing (CN)

(73) Assignee: QUALCOMM Incorporated, San Diego, CA (US)

( * ) Notice: Subject to any disclaimer, the term of this patent is extended or adjusted under 35 U.S.C. 154(b) by 507 days.

(21) Appl. No.: 18/546,491

(22) PCT Filed: Apr. 15, 2021

(86) PCT No.: PCT/CN2021/087436

§ 371 (c)(1),
(2) Date: Aug. 15, 2023

(87) PCT Pub. No.: WO2022/217532

PCT Pub. Date: Oct. 20, 2022

(65) Prior Publication Data

US 2024/0146592 A1 May 2, 2024

(51) Int. Cl.
*H04L 27/26* (2006.01)
*H04W 56/00* (2009.01)
*H04W 84/06* (2009.01)

(52) U.S. Cl.
CPC .... *H04L 27/26025* (2021.01); *H04L 27/2605* (2013.01); *H04W 56/0015* (2013.01); *H04W 84/06* (2013.01)

(58) Field of Classification Search
CPC ........... H04L 27/26025; H04L 27/2605; H04L 27/2607; H04L 27/261; H04L 5/005;
(Continued)

(56) References Cited

U.S. PATENT DOCUMENTS 11,765,207 B1 * 9/2023 McCarthy ............. G06F 40/186
11,937,129 B2 * 3/2024 Rico Alvarino ...... H04L 1/1812
(Continued)

FOREIGN PATENT DOCUMENTS

CA 3054543 A1 * 8/2018 ........... H04L 5/0053
CN 115443634 A * 12/2022 ............ H04W 72/53
(Continued)

OTHER PUBLICATIONS

L. Ma and C. Zhang, "5G wareforms design for aeronautical communications," 2016 IEEE/AIAA 35th Digital Avionics Systems Conference (DASC), Sacramento, CA, USA, 2016, pp. 1-7, doi: 10.1109/DASC.2016.7777945 (Year: 2016).*
(Continued)

*Primary Examiner* — Phirin Sam
*Assistant Examiner* — Louis Samara
(74) *Attorney, Agent, or Firm* — Harrity & Harrity, LLP

(57) ABSTRACT

A method performed by a user equipment (UE) includes: determining to operate using a numerology comprising at least one item from a list consisting of: a subcarrier spacing of 60 kHz or greater, a cyclic prefix greater than 8 μs, and ten symbols per slot; and detecting and processing a first synchronization signal block (SSB), the first SSB associated with a burst set, wherein the burst set includes a plurality of SSBs having time domain (TD) locations fitting into 1 ms duration or 2 ms duration, the plurality of SSBs including 4, 5, 6, or 8 SSBs.

20 Claims, 11 Drawing Sheets

(58) Field of Classification Search
CPC H04L 5/0053; H04W 56/0015; H04W 84/06; H04W 72/23
See application file for complete search history.

(56) References Cited

U.S. PATENT DOCUMENTS

| | | | | |
|---|---|---|---|---|
| 11,968,634 | B2 * | 4/2024 | Abotabl | H04L 5/0048 |
| 12,052,206 | B1 * | 7/2024 | Lai | G06Q 50/205 |
| 2017/0311315 | A1 * | 10/2017 | Islam | H04L 27/26025 |
| 2020/0099493 | A1 * | 3/2020 | Ko | H04J 11/0069 |
| 2020/0229017 | A1 * | 7/2020 | Liu | H04W 76/27 |
| 2021/0029679 | A1 * | 1/2021 | Si | H04W 72/21 |
| 2021/0045141 | A1 | 2/2021 | Lee et al. | |
| 2021/0084605 | A1 * | 3/2021 | Wu | H04J 3/06 |
| 2021/0105761 | A1 * | 4/2021 | Cheng | H04B 7/18504 |
| 2021/0153250 | A1 * | 5/2021 | Jiang | H04L 1/00 |
| 2021/0321327 | A1 * | 10/2021 | Miranda | H04B 7/18506 |
| 2023/0059563 | A1 * | 2/2023 | Harada | H04L 5/0048 |
| 2024/0137966 | A1 * | 4/2024 | Li | H04W 72/23 |

FOREIGN PATENT DOCUMENTS

| | | | | |
|---|---|---|---|---|
| EP | 3457792 | A1 | 3/2019 | |
| EP | 3823369 | A1 | 5/2021 | |
| WO | WO-2018231014 | A1 * | 12/2018 | H04L 27/2657 |
| WO | 2020032781 | A1 | 2/2020 | |
| WO | WO-2021066277 | A1 * | 4/2021 | H04W 72/23 |
| WO | WO-2021137043 | A1 * | 7/2021 | H03H 17/06 |

OTHER PUBLICATIONS

CATT: “Feature Lead Summary on AI 7.2.4.3 Sidelink Synchronization Mechanism”, 3GPP Draft, 3GPP TSG RAN WG1 Meeting #99, R1-1913465, 3rd Generation Partnership Project (3GPP), Mobile Competence Centre, 650, Route Des Lucioles, F-06921 Sophia-Antipolis Cedex, France, vol. RAN WG1, No. Reno, USA, Nov. 18, 2019-Nov. 22, 2019, Nov. 25, 2019 (Nov. 25, 2019), XP051830743, 45 Pages, p. 16-p. 17.

Intel Corporation: “Remaining Details of SS Blocks”, 3GPP TSG RAN WG1 Meeting #90bis, R1-1717353 Intel SS Blocks, 3rd Generation Partnership Project (3GPP), Mobile Competence Centre, 650, Route Des Lucioles, F-06921 Sophia-Antipolis Cedex, France, vol. RAN WG1, No. Prague, Czech Republic, Oct. 9, 2017-Oct. 13, 2017, 8 Pages, Oct. 8, 2017 (Oct. 8, 2017), XP051340543.

International Search Report and Written Opinion—PCT/CN2021/087436—ISA/EPO—Jan. 20, 2022.

Ma, L., et al., “5G Wareforms Design for Aeronautical Communications”, 2016 IEEE/AIAA 35th Digital Avionics Systems Conference (DASC), IEEE, Sep. 25, 2016 (Sep. 25, 2016), XP033019213, pp. 1-7, DOI: 10.1109/DASC.2016.7777945 [retrieved on Dec. 7, 2016] p. 2-p. 3.

Moderator (Lenovo): “Feature Lead Summary for 852.6 GHz PDCCH Monitoring Enhancements”, 3GPP TSG RAN WG1#104-e, R1-2103689, 3rd Generation Partnership Project, Mobile Competence Centre, 650, Route Des Lucioles, F-06921 Sophia-Antipolis Cedex, France, vol. RAN WG1, No. e-Meeting, Apr. 12, 2021-Apr. 20, 2021, Apr. 13, 2021, XP051995264, 71 Pages, p. 36-p. 37, Sections 1-3.

Partial International Search Report—PCT/CN2021/087436—ISA/EPO—Oct. 7, 2021.

Samsung, et al., “Summary on Supporting Multiple SCSs for SS Block”, 3GPP TSG RAN WG1 Meeting #90bis, 3GPP Draft, R1-1718818 Summary On Supporting Multiple SCSS for SS Block, 3rd Generation Partnership Project (3GPP), Mobile Competence Centre, 650, Route Des Lucioles, F-06921 Sophia-Antipolis Cedex, France, vol. RAN WG1, No. Prague, P.R. Czechia, Oct. 9, 2017-Oct. 13, 2017, 8 Pages, Oct. 11, 2017 (Oct. 11, 2017), XP051353345.

* cited by examiner

| Param/ Numerlogy (u) | -1 | -1B | 0 | 1 | 1 (ECP) | 2 | 2 (ECP) | 2 (eECP) | 3 | 4 |
|---|---|---|---|---|---|---|---|---|---|---|
| SCS (KHz) | 7.5 | 7.5 | 15 | 30 | 30 | 60 | 60 | 60 | 120 | 240 |
| Sym-Duration (us) | 133.3 | 133.3 | 66.67 | 33.33 | 33.33 | 16.67 | 16.67 | 16.67 | 8.33 | 4.17 |
| CP (us) | 9.40 | 9.40 | 4.69 | 2.34 | 8.33 | 1.17 | 4.16 | 8.33 | 0.57 | 0.29 |
| Total-Sym-Duration (us) | 142.7 | 142.7 | 71.35 | 35.68 | 41.67 | 17.84 | 20.83 | 25 | 8.92 | 4.46 |
| # OFDM syms Per slot | 7 | 14 | 14 | 14 | 12 | 14 | 12 | 10 | 14 | 14 |

FIG. 4

SYNCHRONIZATION SIGNAL BLOCK ENHANCEMENT FOR ADDITIONAL NUMEROLOGIES

CROSS-REFERENCE TO RELATED APPLICATIONS

The present application is a 35 U.S.C. 371 National Phase entry of Patent Cooperation Treaty (PCT) Application No. PCT/CN2021/087436, filed Apr. 15, 2021, which is hereby incorporated by reference in its entirety as if fully set forth below and for all applicable purposes.

TECHNICAL FIELD

This application relates to wireless communication systems, and more particularly to techniques to enhance synchronization signal blocks (SSBs) for additional numerologies.

INTRODUCTION

Wireless communications systems are widely deployed to provide various types of communication content such as voice, video, packet data, messaging, broadcast, and so on. These systems may be capable of supporting communication with multiple users by sharing the available system resources (e.g., time, frequency, and power). A wireless multiple-access communications system may include a number of base stations (BSs), each simultaneously supporting communications for multiple communication devices, which may be otherwise known as user equipment (UE).

To meet the growing demands for expanded mobile broadband connectivity, wireless communication technologies are advancing from the long term evolution (LTE) technology to a next generation new radio (NR) technology, which may be referred to as 5th Generation (5G). For example, NR is designed to provide a lower latency, a higher bandwidth or a higher throughput, and a higher reliability than LTE. NR is designed to operate over a wide array of spectrum bands, for example, from low-frequency bands below about 1 gigahertz (GHz) and mid-frequency bands from about 1 GHz to about 6 GHz, to high-frequency bands such as mmWave bands. NR is also designed to operate across different spectrum types, from licensed spectrum to unlicensed and shared spectrum. Spectrum sharing enables operators to opportunistically aggregate spectrums to dynamically support high-bandwidth services. Spectrum sharing can extend the benefit of NR technologies to operating entities that may not have access to a licensed spectrum.

NR technology may also make use of a variety of different base station and user equipment technologies to maintain communication at acceptable throughput rates. An example type of base station and user equipment technology includes air to ground (ATG) applications. An example of an ATG application includes a base station having antennas oriented generally upward communicating with an aircraft-based user equipment. ATG base stations may have large radio frequency (RF) footprints, e.g., a radius of hundreds of kilometers. By contrast, a typical terrestrial base station may have a footprint of only a few kilometers. Therefore, an ATG application may benefit from different numerologies than those traditionally used with terrestrial applications, but implementing different numerologies may create a need for addressing time domain and frequency domain characteristics of signals, such as synchronization signal blocks (SSBs).

BRIEF SUMMARY OF SOME EXAMPLES

The following summarizes some aspects of the present disclosure to provide a basic understanding of the discussed technology. This summary is not an extensive overview of all contemplated features of the disclosure and is intended neither to identify key or critical elements of all aspects of the disclosure nor to delineate the scope of any or all aspects of the disclosure. Its sole purpose is to present some concepts of one or more aspects of the disclosure in summary form as a prelude to the more detailed description that is presented later.

For example, in an aspect of the disclosure, a method performed by a user equipment (UE), the method includes: determining to operate using a numerology comprising at least one item from a list consisting of: a subcarrier spacing of 60 kHz or greater, a cyclic prefix greater than 8 μs, and ten symbols per slot; and detecting and processing a first synchronization signal block (SSB), the first SSB associated with a burst set, wherein the burst set includes a plurality of SSBs having time domain (TD) locations fitting into 1 ms duration or 2 ms duration, the plurality of SSBs including 4, 5, 6, or 8 SSBs.

In another aspect, a UE includes: means for operating in a first mode, the first mode associated with air to ground (ATG) operation; and means for identifying a synchronization signal block (SSB) having a subcarrier spacing of 60 kHz or greater and a bandwidth of fewer than 20 resource blocks in accordance with the first mode.

In another aspect, a UE includes: a transceiver; and a processor configured to control the transceiver, the processor further configured to: operate using a numerology comprising at least one item from a list consisting of: a subcarrier spacing of 60 kHz or greater, a cyclic prefix greater than 8 μs, and ten symbols per slot; and detect and process a first synchronization signal block (SSB), the first SSB associated with a burst set, wherein the burst set includes a plurality of SSBs having time domain (TD) locations fitting into 1 ms duration or 2 ms duration, the plurality of SSBs including 4, 5, 6, or 8 SSBs.

In another aspect, a non-transitory computer-readable medium having program code recorded thereon includes: code for determining to operate in a first mode, the first mode associated with air to ground (ATG) operation; and code for identifying a synchronization signal block (SSB) having a subcarrier spacing of 60 kHz or greater and a bandwidth of fewer than 20 resource blocks in response to operating in the first mode.

Other aspects, features, and embodiments of the present disclosure will become apparent to those of ordinary skill in the art, upon reviewing the following description of specific, exemplary embodiments of the present disclosure in conjunction with the accompanying figures. While features of the present disclosure may be discussed relative to certain embodiments and figures below, all embodiments of the present disclosure can include one or more of the advantageous features discussed herein. In other words, while one or more embodiments may be discussed as having certain advantageous features, one or more of such features may also be used in accordance with the various embodiments of the disclosure discussed herein. In similar fashion, while exemplary embodiments may be discussed below as device, system, or method embodiments it should be understood that such exemplary embodiments can be implemented in various devices, systems, and methods.

BRIEF DESCRIPTION OF THE DRAWINGS

FIG. 4 is an illustration of example numerologies according to some aspects of the present disclosure.

DETAILED DESCRIPTION

Figure 1:
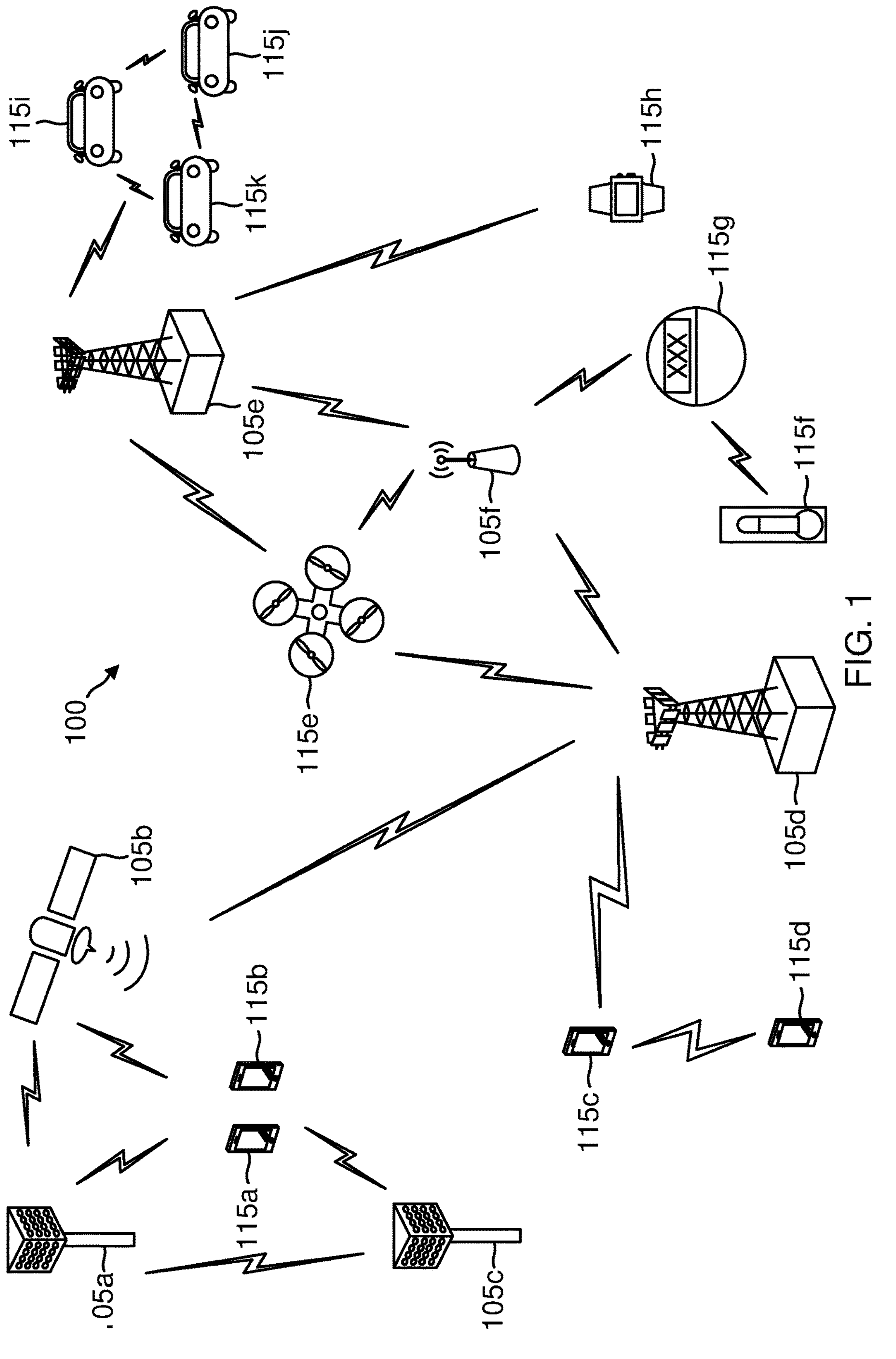
FIG. 1 illustrates a wireless communication network according to some aspects of the present disclosure.

The detailed description set forth below, in connection with the appended drawings, is intended as a description of various configurations and is not intended to represent the only configurations in which the concepts described herein may be practiced. The detailed description includes specific details for the purpose of providing a thorough understanding of the various concepts. However, it will be apparent to those skilled in the art that these concepts may be practiced without these specific details. In some instances, well-known structures and components are shown in block diagram form in order to avoid obscuring such concepts.

As described in more detail below, various implementations include methods of wireless communication, apparatuses, and non-transitory computer-readable media that provide time domain and frequency domain enhancements for synchronization signal blocks (SSBs) for use with different numerologies, and which may be applicable to air to ground (ATG) applications. For instance, a piece of terrestrial user equipment (UE) may operate using a non-traditional numerology, such as a numerology with a subcarrier spacing of 60 kHz or greater and a cyclic prefix greater than about 8 μs. In doing so, the UE may look for SSBs that may have time domain locations fitting into 1 ms or 2 ms durations, including 4/5/6/8 SSBs for each synchronization signal (SSS) burst set. In one example, an aircraft UE may be preprogrammed to identify such SSBs during initial access. In another example, a UE may be preprogrammed to identify an SSB having a reduced bandwidth, such as fewer than 20 resource blocks.

This disclosure relates generally to wireless communications systems, also referred to as wireless communications networks. In various implementations, the techniques and apparatus may be used for wireless communication networks such as code division multiple access (CDMA) networks, time division multiple access (TDMA) networks, frequency division multiple access (FDMA) networks, orthogonal FDMA (OFDMA) networks, single-carrier FDMA (SC-FDMA) networks, LTE networks, Global System for Mobile Communications (GSM) networks, 5th Generation (5G) or new radio (NR) networks, as well as other communications networks. As described herein, the terms "networks" and "systems" may be used interchangeably.

An OFDMA network may implement a radio technology such as evolved UTRA (E-UTRA), Institute of Electrical and Electronics Engineers (IEEE) 802.11, IEEE 802.16, IEEE 802.20, flash-OFDM and the like. UTRA, E-UTRA, and GSM are part of universal mobile telecommunication system (UMTS). In particular, long term evolution (LTE) is a release of UMTS that uses E-UTRA. UTRA, E-UTRA, GSM, UMTS and LTE are described in documents provided from an organization named "3$^{rd}$ Generation Partnership Project" (3GPP), and cdma2000 is described in documents from an organization named "3$^{rd}$ Generation Partnership Project 2" (3GPP2). These various radio technologies and standards are known or are being developed. For example, the 3$^{rd}$ Generation Partnership Project (3GPP) is a collaboration between groups of telecommunications associations that aims to define a globally applicable third generation (3G) mobile phone specification. 3GPP long term evolution (LTE) is a 3GPP project which was aimed at improving the UMTS mobile phone standard. The 3GPP may define specifications for the next generation of mobile networks, mobile systems, and mobile devices. The present disclosure is concerned with the evolution of wireless technologies from LTE, 4G, 5G, NR, and beyond with shared access to wireless spectrum between networks using a collection of new and different radio access technologies or radio air interfaces.

In particular, 5G networks contemplate diverse deployments, diverse spectrum, and diverse services and devices that may be implemented using an OFDM-based unified, air interface. In order to achieve these goals, further enhancements to LTE and LTE-A are considered in addition to development of the new radio technology for 5G NR networks. The 5G NR will be capable of scaling to provide coverage (1) to a massive Internet of things (IoTs) with a ULtra-high density (e.g., ~1M nodes/km$^2$), ultra-low complexity (e.g., ~10 s of bits/sec), ultra-low energy (e.g., ~10+ years of battery life), and deep coverage with the capability to reach challenging locations; (2) including mission-critical control with strong security to safeguard sensitive personal, financial, or classified information, ultra-high reliability (e.g., ~99.9999% reliability), ultra-low latency (e.g., ~1 ms), and users with wide ranges of mobility or lack thereof; and (3) with enhanced mobile broadband including extreme high capacity (e.g., ~10 Tbps/km$^2$), extreme data rates (e.g., multi-Gbps rate, 100+ Mbps user experienced rates), and deep awareness with advanced discovery and optimizations.

The 5G NR may be implemented to use optimized OFDM-based waveforms with scalable numerology and transmission time interval (TTI); having a common, flexible framework to efficiently multiplex services and features with a dynamic, low-latency time division duplex (TDD)/frequency division duplex (FDD) design; and with advanced wireless technologies, such as massive multiple input, multiple output (MIMO), robust millimeter wave (mmWave) transmissions, advanced channel coding, and device-centric mobility. Scalability of the numerology in 5G NR, with scaling of subcarrier spacing, may efficiently address operating diverse services across diverse spectrum and diverse deployments. For example, in various outdoor and macro coverage deployments of less than 3 GHz FDD/TDD implementations, subcarrier spacing (SCS) may occur with 15 kHz, for example over 5, 10, 20 MHz, and the like bandwidth (BW). For other various outdoor and small cell coverage deployments of TDD greater than 3 GHz, subcarrier spacing may occur with 30 kHz over a 80/100 MHz BW. For other various indoor wideband implementations, using a TDD over the unlicensed portion of the 5 GHz band, the subcarrier spacing may occur with 60 kHz over a 160 MHz BW. Finally, for various deployments transmitting with mmWave components at a TDD of 28 GHz, subcarrier spacing may occur with 120 kHz over a 500 MHz BW.

The scalable numerology of the 5G NR facilitates scalable TTI for diverse latency and quality of service (QoS) requirements. For example, shorter TTI may be used for low latency and high reliability, while longer TTI may be used for higher spectral efficiency. The efficient multiplexing of long and short TTIs may allow transmissions to start on symbol boundaries. 5G NR also contemplates a self-contained integrated subframe design with uplink/downlink scheduling information, data, and acknowledgement in the same subframe. The self-contained integrated subframe supports communications in unlicensed or contention-based shared spectrum, adaptive uplink/downlink that may be flexibly configured on a per-cell basis to dynamically switch between uplink (UL) and downlink (DL) to meet the current traffic needs.

FIG. 1 illustrates a wireless communication network 100 according to some aspects of the present disclosure. The network 100 may be a 5G network. The network 100 includes a number of base stations (BSs) 105 (individually labeled as 105*a*, 105*b*, 105*c*, 105*d*, 105*e*, and 105*f*) and other network entities. A BS 105 may be a station that communicates with UEs 115 and may also be referred to as an evolved node B (eNB), a next generation eNB (gNB), an access point, and the like. Each BS 105 may provide communication coverage for a particular geographic area. In 3GPP, the term "cell" can refer to this particular geographic coverage area of a BS 105 and/or a BS subsystem serving the coverage area, depending on the context in which the term is used. The actions of FIG. 7 may be performed by any of BSs 105.

A BS 105 may provide communication coverage for a macro cell or a small cell, such as a pico cell or a femto cell, and/or other types of cell. A macro cell generally covers a relatively large geographic area (e.g., several kilometers in radius) and may allow unrestricted access by UEs with service subscriptions with the network provider. A small cell, such as a pico cell, would generally cover a relatively smaller geographic area and may allow unrestricted access by UEs with service subscriptions with the network provider. A small cell, such as a femto cell, would also generally cover a relatively small geographic area (e.g., a home) and, in addition to unrestricted access, may also provide restricted access by UEs having an association with the femto cell (e.g., UEs in a closed subscriber group (CSG), UEs for users in the home, and the like). ABS for a macro cell may be referred to as a macro BS. ABS for a small cell may be referred to as a small cell BS, a pico BS, a femto BS or a home BS. In the example shown in FIG. 1, the BSs 105*b*, 105*d*, and 105*e* may be regular macro BSs, while the BSs 105*a* and 105*c* may be macro BSs enabled with one of three dimension (3D), full dimension (FD), or massive MIMO. The BSs 105*a* and 105*c* may take advantage of their higher dimension MIMO capabilities to exploit 3D beamforming in both elevation and azimuth beamforming to increase coverage and capacity. The BS 105*f* may be a small cell BS which may be a home node or portable access point. A BS 105 may support one or multiple (e.g., two, three, four, and the like) cells.

The network 100 may support synchronous or asynchronous operation. For synchronous operation, the B Ss may have similar frame timing, and transmissions from different BSs may be approximately aligned in time. For asynchronous operation, the BSs may have different frame timing, and transmissions from different BSs may not be aligned in time.

The UEs 115 are dispersed throughout the wireless network 100, and each UE 115 may be stationary or mobile. A UE 115 may also be referred to as a terminal, a mobile station, a subscriber unit, a station, or the like. A UE 115 may be a cellular phone, a personal digital assistant (PDA), a wireless modem, a wireless communication device, a handheld device, a tablet computer, a laptop computer, a cordless phone, a wireless local loop (WLL) station, or the like. In one aspect, a UE 115 may be a device that includes a Universal Integrated Circuit Card (UICC). In another aspect, a UE may be a device that does not include a UICC. In some aspects, the UEs 115 that do not include UICCs may also be referred to as IoT devices or internet of everything (IoE) devices. The UEs 115*a*-115*d* are examples of mobile smart phone-type devices accessing network 100. A UE 115 may also be a machine specifically configured for connected communication, including machine type communication (MTC), enhanced MTC (eMTC), narrowband IoT (NB-IoT) and the like. The UEs 115*e*-115*h* are examples of various machines configured for communication that access the network 100. The UEs 115*i*-115*k* are examples of vehicles equipped with wireless communication devices configured for communication that access the network 100. A UE 115 may be able to communicate with any type of the BSs, whether macro BS, small cell, or the like. In FIG. 1, a lightning bolt (e.g., communication links) indicates wireless transmissions between a UE 115 and a serving BS 105, which is a BS designated to serve the UE 115 on the downlink (DL) and/or uplink (UL), desired transmission between BSs 105, backhaul transmissions between BSs, or sidelink transmissions between UEs 115.

Figure 5:
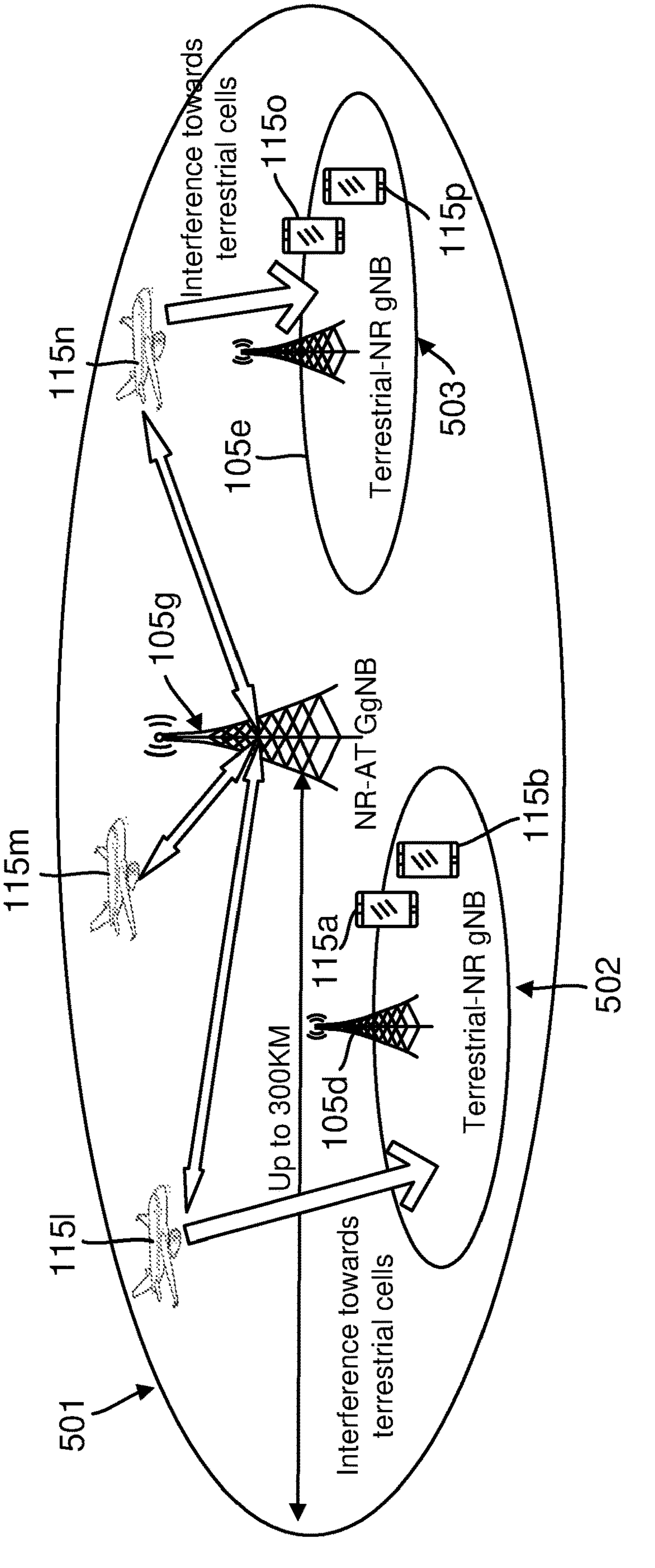
FIG. 5 is an illustration of an example relationship between an air to ground (ATG) cell and two different terrestrial cells, according to some aspects of the present disclosure.

FIG. 5 provides other examples of BSs 105 and UEs 115, and it is understood that those BSs 105 and UEs 115 operate the same as or similarly to those described with respect to FIG. 1. For instance, FIG. 5 illustrates an ATG BS 105*g* and three ATG UEs 115*l*-*n*. These additional assets are described in more detail below.

Now returning to FIG. 1, in operation, the BSs 105*a* and 105*c* may serve the UEs 115*a* and 115*b* using 3D beamforming and coordinated spatial techniques, such as coordinated multipoint (CoMP) or multi-connectivity. The macro BS 105*d* may perform backhaul communications with the BSs 105*a* and 105*c*, as well as small cell, the BS 105*f*. The macro BS 105*d* may also transmit multicast services which are subscribed to and received by the UEs 115*c* and 115*d*. Such multicast services may include mobile television or stream video, or may include other services for providing community information, such as weather emergencies or alerts, such as Amber alerts or gray alerts.

The BSs 105 may also communicate with a core network. The core network may provide user authentication, access authorization, tracking, Internet Protocol (IP) connectivity, and other access, routing, or mobility functions. At least some of the BSs 105 (e.g., which may be an example of a gNB or an access node controller (ANC)) may interface with the core network through backhaul links (e.g., NG-C, NG-U, etc.) and may perform radio configuration and scheduling for communication with the UEs 115. In various examples, the BSs 105 may communicate, either directly or indirectly (e.g., through core network), with each other over backhaul links (e.g., X1, X2, etc.), which may be wired or wireless communication links.

The network 100 may also support mission critical communications with ultra-reliable and redundant links for mission critical devices, such as the UE 115*e*, which may be a drone. Redundant communication links with the UE 115*e* may include links from the macro BSs 105*d* and 105*e*, as well as links from the small cell BS 105*f*. Other machine type devices, such as the UE 115*f* (e.g., a thermometer), the UE 115*g* (e.g., smart meter), and UE 115*h* (e.g., wearable device) may communicate through the network 100 either directly with BSs, such as the small cell BS 105*f*, and the macro BS 105*e*, or in multi-step-size configurations by communicating with another user device which relays its information to the network, such as the UE 115*f* communicating temperature measurement information to the smart meter, the UE 115*g*, which is then reported to the network through the small cell BS 105*f*. The network 100 may also provide additional network efficiency through dynamic, low-latency TDD/FDD communications, such as vehicle-to-vehicle (V2V), vehicle-to-everything (V2X), cellular-V2X (C-V2X) communications between a UE 115*i*, 115*j*, or 115*k* and other UEs 115, and/or vehicle-to-infrastructure (V2I) communications between a UE 115*i*, 115*j*, or 115*k* and a BS 105. Additionally, BS 105*b* is shown as a non-terrestrial network (NTN) resource, such as a satellite that orbits the earth. In this example, BS 105*b* may include multiple antenna arrays, each array forming a relatively fixed beam. BS 105*b* may be configured as a single cell with multiple beams and BWPs, as explained in more detail below.

In some implementations, the network 100 utilizes OFDM-based waveforms for communications. An OFDM-based system may partition the system BW into multiple (K) orthogonal subcarriers, which are also commonly referred to as subcarriers, tones, bins, or the like. Each subcarrier may be modulated with data. In some instances, the subcarrier spacing between adjacent subcarriers may be fixed, and the total number of subcarriers (K) may be dependent on the system BW. The system BW may also be partitioned into subbands. In other instances, the subcarrier spacing and/or the duration of TTIs may be scalable.

In some aspects, the BSs 105 can assign or schedule transmission resources (e.g., in the form of time-frequency resource blocks (RB)) for downlink (DL) and uplink (UL) transmissions in the network 100. DL refers to the transmission direction from a BS 105 to a UE 115, whereas UL refers to the transmission direction from a UE 115 to a BS 105. The communication can be in the form of radio frames. A radio frame may be divided into a plurality of subframes or slots, for example, about 10. Each slot may be further divided into mini-slots. In a FDD mode, simultaneous UL and DL transmissions may occur in different frequency bands. For example, each subframe includes a UL subframe in a UL frequency band and a DL subframe in a DL frequency band. In a TDD mode, UL and DL transmissions occur at different time periods using the same frequency band. For example, a subset of the subframes (e.g., DL subframes) in a radio frame may be used for DL transmissions and another subset of the subframes (e.g., UL subframes) in the radio frame may be used for UL transmissions.

The DL subframes and the UL subframes can be further divided into several regions. For example, each DL or UL subframe may have pre-defined regions for transmissions of reference signals, control information, and data. Reference signals are predetermined signals that facilitate the communications between the BSs 105 and the UEs 115. For example, a reference signal can have a particular pilot pattern or structure, where pilot tones may span across an operational BW or frequency band, each positioned at a pre-defined time and a pre-defined frequency. For example, a BS 105 may transmit cell specific reference signals (CRSs) and/or channel state information—reference signals (CSI-RSs) to enable a UE 115 to estimate a DL channel. Similarly, a UE 115 may transmit sounding reference signals (SRSs) to enable a BS 105 to estimate a UL channel. Control information may include resource assignments and protocol controls. Data may include protocol data and/or operational data. In some aspects, the BSs 105 and the UEs 115 may communicate using self-contained subframes. A self-contained subframe may include a portion for DL communication and a portion for UL communication. A self-contained subframe can be DL-centric or UL-centric. A DL-centric subframe may include a longer duration for DL communication than for UL communication. A UL-centric subframe may include a longer duration for UL communication than for UL communication.

In some aspects, the network 100 may be an NR network deployed over a licensed spectrum. The BSs 105 can transmit synchronization signals (e.g., including a primary synchronization signal (PSS) and a secondary synchronization signal (SSS)) in the network 100 to facilitate synchronization. The BSs 105 can broadcast system information associated with the network 100 (e.g., including a master information block (MIB), remaining system information (RMSI), and other system information (OSI)) to facilitate initial network access. In some instances, the BSs 105 may broadcast the PSS, the SSS, and/or the MIB in the form of synchronization signal blocks (SSBs) over a physical broadcast channel (PBCH) and may broadcast the RMSI and/or the OSI over a physical downlink shared channel (PDSCH).

In some aspects, a UE 115 attempting to access the network 100 may perform an initial cell search by detecting a PSS from a BS 105. The PSS may enable synchronization of period timing and may indicate a physical layer identity value. The UE 115 may then receive a SSS. The SSS may enable radio frame synchronization, and may provide a cell identity value, which may be combined with the physical layer identity value to identify the cell. The PSS and the SSS may be located in a central portion of a carrier or any suitable frequencies within the carrier.

After receiving the PSS and SSS, the UE 115 may receive a MIB. The MIB may include system information for initial network access and scheduling information for RMSI and/or OSI. After decoding the MIB, the UE 115 may receive RMSI and/or OSI. The RMSI and/or OSI may include radio resource control (RRC) information related to random access channel (RACH) procedures, paging, control resource set (CORESET) for physical downlink control channel (PDCCH) monitoring, physical UL control channel (PUCCH), physical UL shared channel (PUSCH), power control, and SRS.

After obtaining the MIB, the RMSI and/or the OSI, the UE 115 can perform a random access procedure to establish a connection with the BS 105. In some examples, the random access procedure may be a four-step random access procedure. For example, the UE 115 may transmit a random access preamble and the BS 105 may respond with a random access response. The random access response (RAR) may include a detected random access preamble identifier (ID) corresponding to the random access preamble, timing advance (TA) information, a UL grant, a temporary cell-radio network temporary identifier (C-RNTI), and/or a back-off indicator. Upon receiving the random access response, the UE 115 may transmit a connection request to the BS 105 and the BS 105 may respond with a connection response. The connection response may indicate a contention resolution. In some examples, the random access preamble, the RAR, the connection request, and the connection response can be referred to as message 1 (MSG1), message 2 (MSG2), message 3 (MSG3), and message 4 (MSG4), respectively. In some examples, the random access procedure may be a two-step random access procedure, where the UE 115 may transmit a random access preamble and a connection request in a single transmission and the BS 105 may respond by transmitting a random access response and a connection response in a single transmission.

After establishing a connection, the UE 115 and the BS 105 can enter a normal operation stage, where operational data may be exchanged. For example, the BS 105 may schedule the UE 115 for UL and/or DL communications. The BS 105 may transmit UL and/or DL scheduling grants to the UE 115 via a PDCCH. The scheduling grants may be transmitted in the form of DL control information (DCI). The BS 105 may transmit a DL communication signal (e.g., carrying data) to the UE 115 via a PDSCH according to a DL scheduling grant. The UE 115 may transmit a UL communication signal to the BS 105 via a PUSCH and/or PUCCH according to a UL scheduling grant.

In some aspects, the BS 105 may communicate with a UE 115 using hybrid automatic repeat request (HARQ) techniques to improve communication reliability, for example, to provide an ultra-reliable low-latency communication (URLLC) service. The BS 105 may schedule a UE 115 for a PDSCH communication by transmitting a DL grant in a PDCCH. The BS 105 may transmit a DL data packet to the UE 115 according to the schedule in the PDSCH. The DL data packet may be transmitted in the form of a transport block (TB). If the UE 115 receives the DL data packet successfully, the UE 115 may transmit a HARQ acknowledgement (ACK) to the BS 105. Conversely, if the UE 115 fails to receive the DL transmission successfully, the UE 115 may transmit a HARQ negative-acknowledgement (NACK) to the BS 105. Upon receiving a HARQ NACK from the UE 115, the BS 105 may retransmit the DL data packet to the UE 115. The retransmission may include the same coded version of DL data as the initial transmission. Alternatively, the retransmission may include a different coded version of the DL data than the initial transmission. The UE 115 may apply soft-combining to combine the encoded data received from the initial transmission and the retransmission for decoding. The BS 105 and the UE 115 may also apply HARQ for UL communications using substantially similar mechanisms as the DL HARQ.

In some aspects, the network 100 may operate over a system BW or a component carrier (CC) BW. The network 100 may partition the system BW into multiple bandwidth parts (BWPs) (e.g., portions). ABS 105 may dynamically assign a UE 115 to operate over a certain BWP (e.g., a certain portion of the system BW). The assigned BWP may be referred to as the active BWP. The UE 115 may monitor the active BWP for signaling information from the BS 105. The BS 105 may schedule the UE 115 for UL or DL communications in the active BWP. In some aspects, a BS 105 may assign a pair of BWPs within the CC to a UE 115 for UL and DL communications. For example, the BWP pair may include one BWP for UL communications and one BWP for DL communications.

In some aspects, the network 100 may operate over a shared channel, which may include shared frequency bands or unlicensed frequency bands. For example, the network 100 may be an NR-unlicensed (NR-U) network. The BSs 105 and the UEs 115 may be operated by multiple network operating entities. To avoid collisions, the BSs 105 and the UEs 115 may employ a listen-before-talk (LBT) procedure to monitor for transmission opportunities (TXOPs) in the shared channel. For example, a transmitting node (e.g., a BS 105 or a UE 115) may perform an LBT prior to transmitting in the channel. When the LBT passes, the transmitting node may proceed with the transmission. When the LBT fails, the transmitting node may refrain from transmitting in the channel. In an example, the LBT may be based on energy detection. For example, the LBT results in a pass when signal energy measured from the channel is below a threshold. Conversely, the LBT results in a failure when signal energy measured from the channel exceeds the threshold. In another example, the LBT may be based on signal detection. For example, the LBT results in a pass when a channel reservation signal (e.g., a predetermined preamble signal) is not detected in the channel.

In some aspects, the network 100 may operate over a high frequency band, for example, in a frequency range 1 (FR1) band or a frequency range 2 (FR2) band. FR1 may refer to frequencies in the sub-6 GHz range and FR2 may refer to frequencies in the mmWave range. To overcome the high path-loss at high frequency, the BSs 105 and the UEs 115 may communicate with each other using directional beams. For instance, a BS 105 may transmit SSBs by sweeping across a set of predefined beam directions and may repeat the SSB transmissions at a certain time interval in the set of beam directions to allow a UE 115 to perform initial network access. In the example of NTN resource 105*b*, it may transmit SSBs on each of its beams at scheduled times, even if the beams do not steer. In some instances, each beam and its corresponding characteristics may be identified by a beam index. For instance, each SSB may include an indication of a beam index corresponding to the beam used for the SSB transmission. The UE 115 may determine signal measurements, such as reference signal received power (RSRP) and/or reference signal received quality (RSRQ), for the SSBs at the different beam directions and select a best DL beam. The UE 115 may indicate the selection by transmitting a physical random access channel (PRACH) signal (e.g., MSG1) using PRACH resources associated with the selected beam direction. For instance, the SSB transmitted in a particular beam direction or on a particular beam may indicate PRACH resources that may be used by a UE 115 to communicate with the BS 105 in that particular beam direction. After selecting the best DL beam, the UE 115 may complete the random access procedure (e.g., the 4-step random access or the 2-step random access) and proceed with network registration and normal operation data exchange with the BS 105. In some instances, the initially selected beams may not be optimal or the channel condition may change, and thus the BS 105 and the UE 115 may perform a beam refinement procedure to refine a beam selection. For instance, BS 105 may transmit CSI-RSs by sweeping narrower beams over a narrower angular range and the UE 115 may report the best DL beam to the BS 105.

When the BS 105 uses a narrower beam for transmission, the BS 105 may apply a higher gain, and thus may provide a better performance (e.g., a higher signal-noise-ratio (SNR)). In some instances, the channel condition may degrade and/or the UE 115 may move out of a coverage of an initially selected beam, and thus the UE 115 may detect a beam failure condition. Upon detecting a beam failure, the UE 115 may perform beam handover.

In some aspects, the network 100 may be an IoT network and the UEs 115 may be IoT nodes, such as smart printers, monitors, gaming nodes, cameras, audio-video (AV) production equipment, industrial IoT devices, and/or the like. The transmission payload data size of an IoT node typically may be relatively small, for example, in the order of tens of bytes. In some aspects, the network 100 may be a massive IoT network serving tens of thousands of nodes (e.g., UEs 115) over a high frequency band, such as a FR1 band or a FR2 band.

Figure 2:
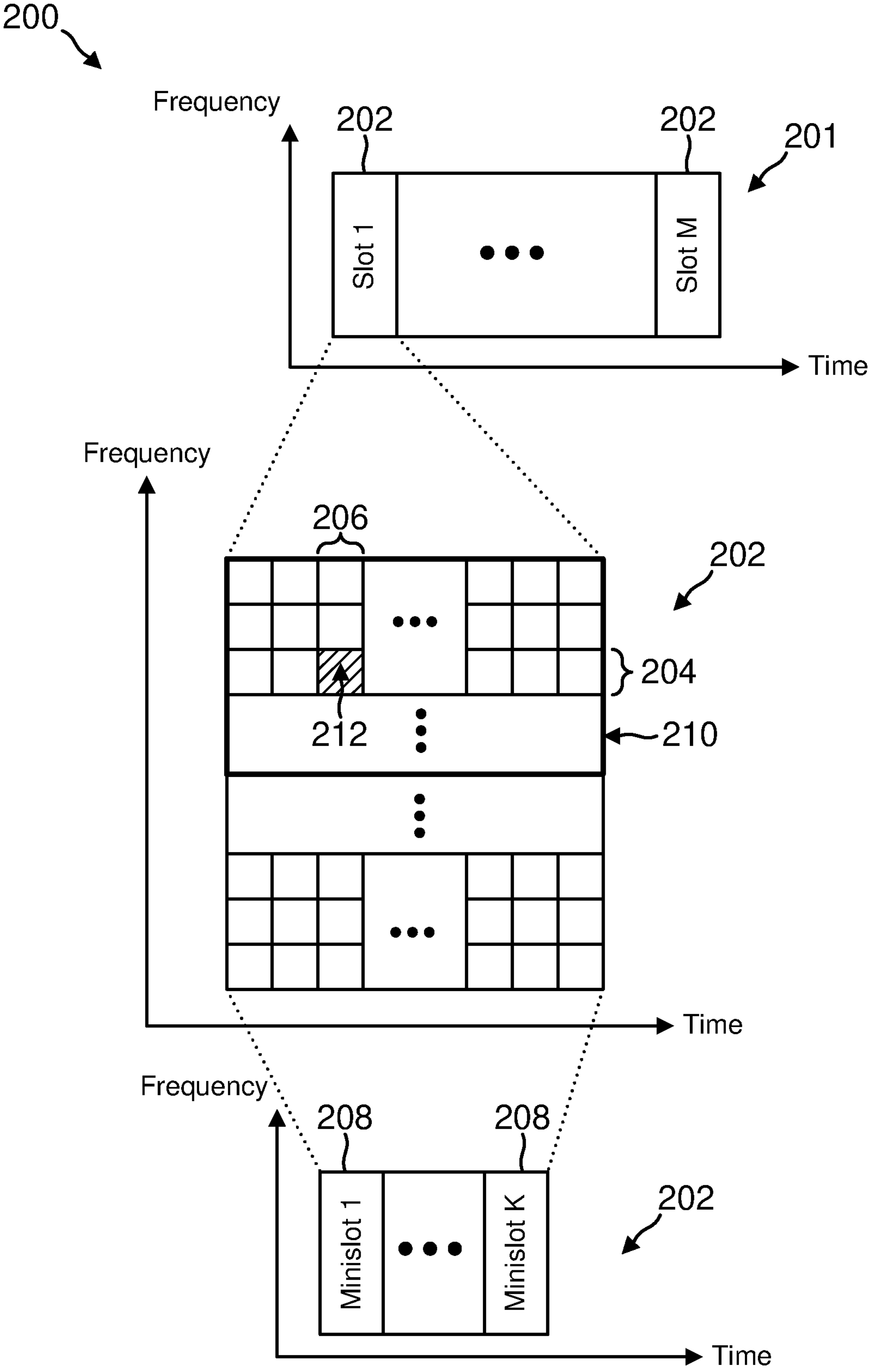
FIG. 2 illustrates a radio frame structure according to some aspects of the present disclosure.

FIG. 2 is a timing diagram illustrating a radio frame structure 200 according to some aspects of the present disclosure. The radio frame structure 200 may be employed by BSs such as the BSs 105 and UEs such as the UEs 115 in a network such as the network 100 for communications. In particular, the BS may communicate with the UE using time-frequency resources configured as shown in the radio frame structure 200. In FIG. 2, the x-axes represent time in some arbitrary units and the y-axes represent frequency in some arbitrary units. The transmission frame structure 200 includes a radio frame 201. The duration of the radio frame 201 may vary depending on the aspects. In an example, the radio frame 201 may have a duration of about ten milliseconds. The radio frame 201 includes M number of slots 202, where M may be any suitable positive integer. In an example, M may be about 10.

Each slot 202 includes a number of subcarriers 204 in frequency and a number of symbols 206 in time. The number of subcarriers 204 and/or the number of symbols 206 in a slot 202 may vary depending on the aspects, for example, based on the channel bandwidth, the subcarrier spacing (SCS), and/or the cyclic prefix (CP). One subcarrier 204 in frequency and one symbol 206 in time forms one resource element (RE) 212 for transmission. A resource block (RB) 210 is formed from a number of consecutive subcarriers 204 in frequency and a number of consecutive symbols 206 in time.

In an example, a BS (e.g., BS 105 in FIG. 1) may schedule a UE (e.g., UE 115 in FIG. 1) for UL and/or DL communications at a time-granularity of slots 202 or mini-slots 208. Each slot 202 may be time-partitioned into K number of mini-slots 208. Each mini-slot 208 may include one or more symbols 206. The mini-slots 208 in a slot 202 may have variable lengths. For example, when a slot 202 includes N number of symbols 206, a mini-slot 208 may have a length between one symbol 206 and (N−1) symbols 206. In some aspects, a mini-slot 208 may have a length of about two symbols 206, about four symbols 206, or about seven symbols 206. In some examples, the BS may schedule UE at a frequency-granularity of a resource block (RB) 210 (e.g., including about 12 subcarriers 204).

Figure 3:
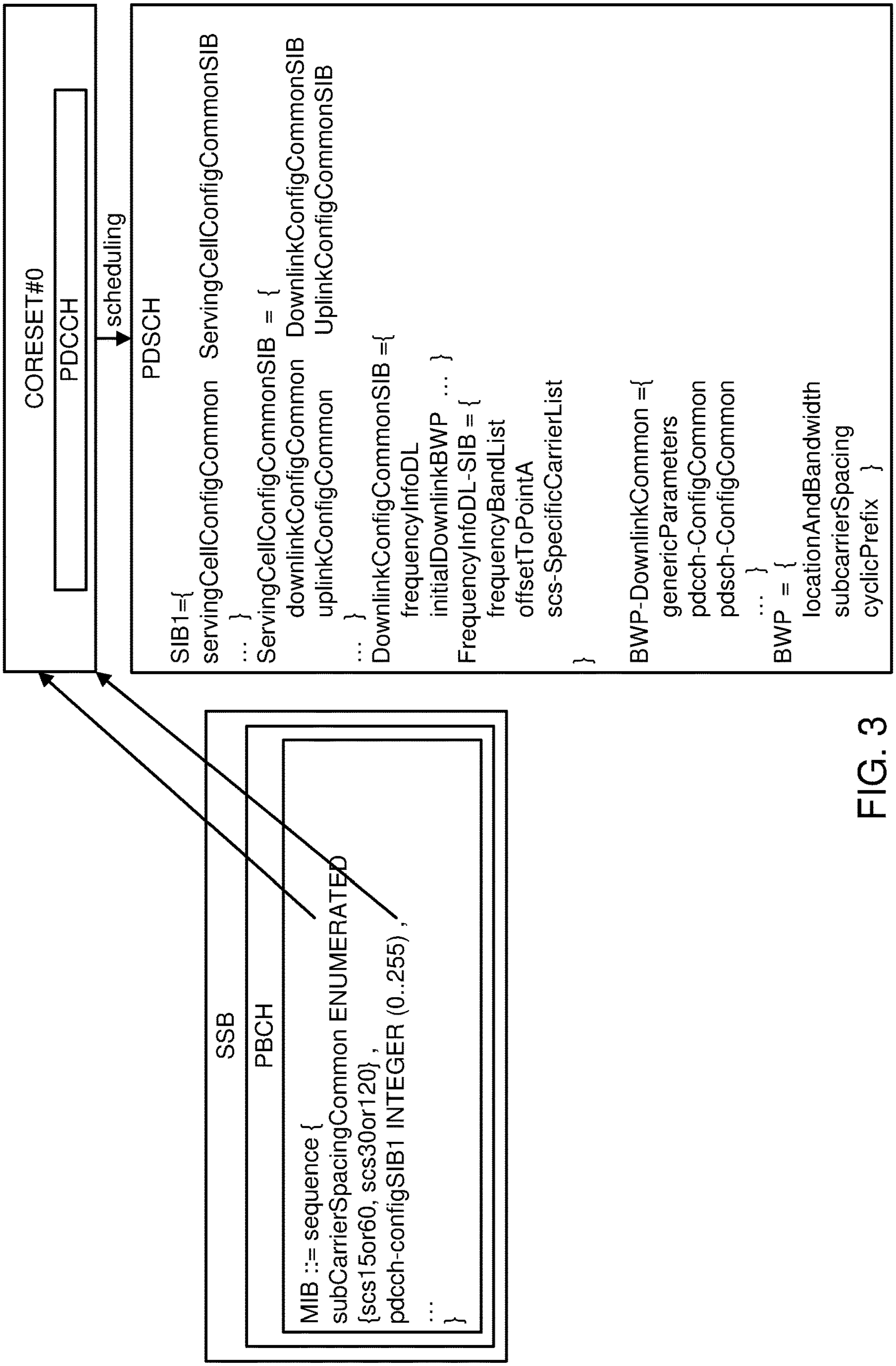
FIG. 3 illustrates a block diagram of an example SSB, according to some aspects of the present disclosure.

FIG. 3 illustrates a process of starting from an SSB to obtain the information about an initial downlink BWP and an initial uplink BWP part. In this implementation, the SSB includes a PBCH that carries MIB. A UE that receives the SSB decodes the SSB to acquire the MIB. The UE then parses the contents of the MIB, which point to a CORESET #0. The CORESET #0 includes a Physical Downlink Control Channel (PDCCH) and the PDCCH schedules system information block 1 (SIB1) on a PDSCH, and the SIB1 has information elements to identify an initial downlink BWP and an initial uplink BWP. The UE parses the contents of the SIB1, finds its initial downlink BWP and its initial uplink BWP and then uses the initial downlink BWP and uplink BWP to communicate with the BS for further configuration. For instance, the UE may communicate with the BS to be assigned a dedicated BWP on a particular beam for data transmission. Of course, some aspects of the disclosure may use a different MIB, a different CORESET #0, or a different SIB 1. The SIB1 also identifies parameters relevant to numerology, such as subcarrier spacing and cyclic prefix.

FIG. 4 is a table illustrating a variety of example numerologies that may be applied in one or more implementations. In this example, each column provides a different numerology, where a numerology includes a set of parameters for communication between a UE and a base station. The first row designates a parameter or numerology (u), which may change among the different columns. For instance, the set of numerologies depicted in the table of FIG. 4 assumes a formula where subcarrier spacing (SCS) is equal to $15*2^u$ KHz. Thus, when u is equal to −1, then the SCS equals 7.5 kHz. Similarly, when u is equal to 0, then SCS equals 15 kHz, and when u is equal to 2, SCS equals 60 KHz.

The second and third rows display symbol duration and cyclic prefix (CP) in microseconds. The fourth row is total symbol duration in microseconds, and it equals the sum of the second and third rows. The fifth row provides a total number of OFDM symbols per slot. For example, the column corresponding to numerology −1 has seven OFDM symbols per slot, whereas the column corresponding to numerology −1B has 14 OFDM symbols per slot. Traditional LTE numerologies include 14 OFDM symbols per slot. However, with new uses for NR being pioneered, other numbers of OFDM symbols per slot are being considered, such as 7 (as in numerology −1), 12 (as in numerology 1 ECP), or 10 (as in numerology 2 e ECP).

It has been observed that in some ATG applications, propagation delay due to reflection off of tall buildings or mountains may be as high as 8.33 μs. Thus, the propagation delay of ATG applications may be significantly more than that expected from NTN applications or terrestrial applications. Some implementations described herein include a cyclic prefix that is equal to or greater than 8.33 μs to accommodate the propagation delay that might be expected in some ATG applications. Another issue in ATG applications might be Doppler effect. For instance, at 700 MHz, a maximum line of sight Doppler effect might be as large as 0.77 kHz. As center frequency increases, the line of sight Doppler effect might increase more than proportionally. For instance, at 3.5 GHz, the maximum line of sight Doppler effect might be around 3.89 kHz, and at 4.8 GHz, the maximum line of sight Doppler effect might be around 5.33 kHz. In some instances, a UE or a base station may have hardware and software capable of compensating for Doppler effect that is as high as about 10% of the SCS. Some UEs or base stations may include better or poorer capability, and this is just an example. Nevertheless, for implementations assuming compensation abilities exist for up to 10% of SCS, then in a numerology using 700 MHz, an SCS of 7.5 kHz or greater would be desirable. Similarly, in a numerology using a center frequency of 3.5 GHz, an SCS of 30 kHz or 60 kHz would be desirable, and in a numerology using 4.8 GHz as a center frequency, an SCS equal to or greater than 60 kHz would be desirable.

However, these concerns may also run into other constraints, such as available bandwidth on a center frequency or attenuation expected to affect a center frequency. Thus, while numerology −1 may have ample SCS and CP at 700 MHz, that center frequency may not provide a desired amount of bandwidth for an ATG UE that is built for 1 GHz or more bandwidth. Similarly, numerologies 3 and 4 may be best reserved for millimeter wave applications, though millimeter wave may experience attenuation that makes it unsuitable for the long distances covered by an ATG base station cell.

One possible solution might be to use numerology 1 ECP, which has an SCS of 30 kHz and a cyclic prefix of 8.33 μs. Numerology 1 ECP may be used with 3.5 GHz, thereby providing SCS of 60 kHz and CP of 8.33 μs. Those parameters may provide acceptable performance in an ATG application, considering propagation delay, Doppler effect, and expected attenuation. Similarly, numerology 2 eECP may be used with either 3.5 GHz or 4.8 GHz as a center frequency to provide SCS of 60 kHz and CP of 8.33 μs. Once again, these parameters may provide acceptable performance in an ATG application. The numerologies including "ECP" refer to an extended CP, which is accomplished by reducing a number of OFDM symbols per slot. Disadvantages associated with ECP numerologies include a reduction in efficiency due to the relative length of the CP versus the total symbol duration as well as mismatch with traditional numerologies having 14 symbols per OFDM slot. However, in some applications, the disadvantages of those numerologies may be outweighed by the advantages. In fact, for any given application, an engineer may pick a numerology for use based on a variety of factors. ATG applications present their own special considerations, propagation delay and Doppler effect being among them, which makes them different from other applications, such as a NTN and car-based terrestrial.

As noted above, traditional LTE numerologies include 14 OFDM symbols per slot. The number of OFDM symbols allow different emitters to coexist more easily. In the case of numerology −1, it has seven OFDM symbols per slot, but it aligns with traditional numerologies including 14 OFDM symbols per slot since 14 is a multiple of seven. However, the other numerologies in the table of FIG. 4 may include 12 OFDM symbols per slot or 10 symbols per slot in order to accommodate a larger CP. Since neither 10 nor 12 are a multiple of seven, such numerologies create misalignment when coexisting with other applications using seven or 14 OFDM symbols per slot. Thus, ATG applications adopting a numerology using 10 or 12 (or some other number of OFDM symbols per slot) may cause incrementally more interference with terrestrial UEs.

FIG. 5 is an illustration of an example wireless communication network according to one implementation. FIG. 5 is offered to illustrate coexistence of an ATG BS 105*g* with a plurality of terrestrial BSs 105*d*, 105*e*. Terrestrial BS 105*d* may be substantially the same as the terrestrial BS 105*d* of FIG. 1. Also, the UEs 115*a*, 115*b* may be the same as or similar to UEs 115*a*, 115*b* of FIG. 1. Terrestrial BS 105*e* may also be the same as or similar to any of the BSs 105 of FIG. 1, and UEs 115*o*, 115*p* may also be the same as or similar to any of the BSs of FIG. 1. And although not shown in FIG. 5, ATG BS 105*g* may have a backhaul connection with either one or both of the terrestrial BSs 105*d*, 105*e*.

ATG BS 105*g* may be implemented in any appropriate manner, although in one example it has antennas that are directed upward for better reception by the ATG UEs 115*l-n*. The UEs 115*l-n* may include hardware mounted to a bottom of an aircraft to facilitate transmission and reception with the antennas of ATG BS 105*g*. Further in this example, ATG BS 105*g* may communicate using greater power than would traditionally be used by any of the terrestrial BSs 105*d*, 105*e*. The greater power allows ATG BS 105*g* to provide transmission and reception over a large cell 501, which in this example is shown as extending up to 300 km. Of course, the scope of implementations includes any appropriate size of cell 501, as 300 km is merely one example. The ATG BSs 1151-*n* may also transmit using a higher power than would traditionally be used with any of the terrestrial UEs 115.

FIG. 5 shows that the terrestrial cells 502, 503 may be encompassed by the large area of ATG cell 501. In some implementations, ATG cell 501 may encompass more or fewer terrestrial cells, and some terrestrial cells may be partially within and partially without cell 501. The two terrestrial cells 502, 503 are shown encompassed by ATG cell 501 for ease of illustration, and it is understood that in some applications an example ATG cell 501 may encompass tens or even hundreds of terrestrial cells within a 200 km or 300 km radius.

An option for multiplexing ATG communications and terrestrial NR is frequency division multiplexing, although that may suffer from low spectral efficiency in some instances. Another more spectral-efficient way to allow a non-orthogonal use of radio frequencies among ATG assets and terrestrial assets is orthogonal time and frequency and space, which may cause other issues to arise. For instance, spectral efficiency may be low at higher frequencies (e.g., 4.8 GHz) due to larger Doppler effect and propagation delay.

Various implementations herein propose to use NR techniques with numerologies, such as that shown in FIG. 4. Specifically, various implementations propose to use numerologies with the subcarrier spacing of 60 kHz and an extended CP for the reasons discussed above. However, no SSB structures are defined in current standards are in use for those numerologies. For instance, there is currently no defined time domain (TD) locations for SSBs with respect to those numerologies. Furthermore, reusing legacy SSB designs results in a bandwidth of 20 physical resource blocks (PRBs), or a bandwidth of about 14.4 MHz for single SSB. This may introduce limits on UE specific PDSCH scheduling, especially if multiple SSBs are frequency division multiplexed in a 100 MHz component carrier (CC). Therefore, various implementations propose usable and advantageous time domain locations as well as a reduced bandwidth SSB that may find use in applications with non-traditional numerologies, such as ATG applications.

Figure 6:
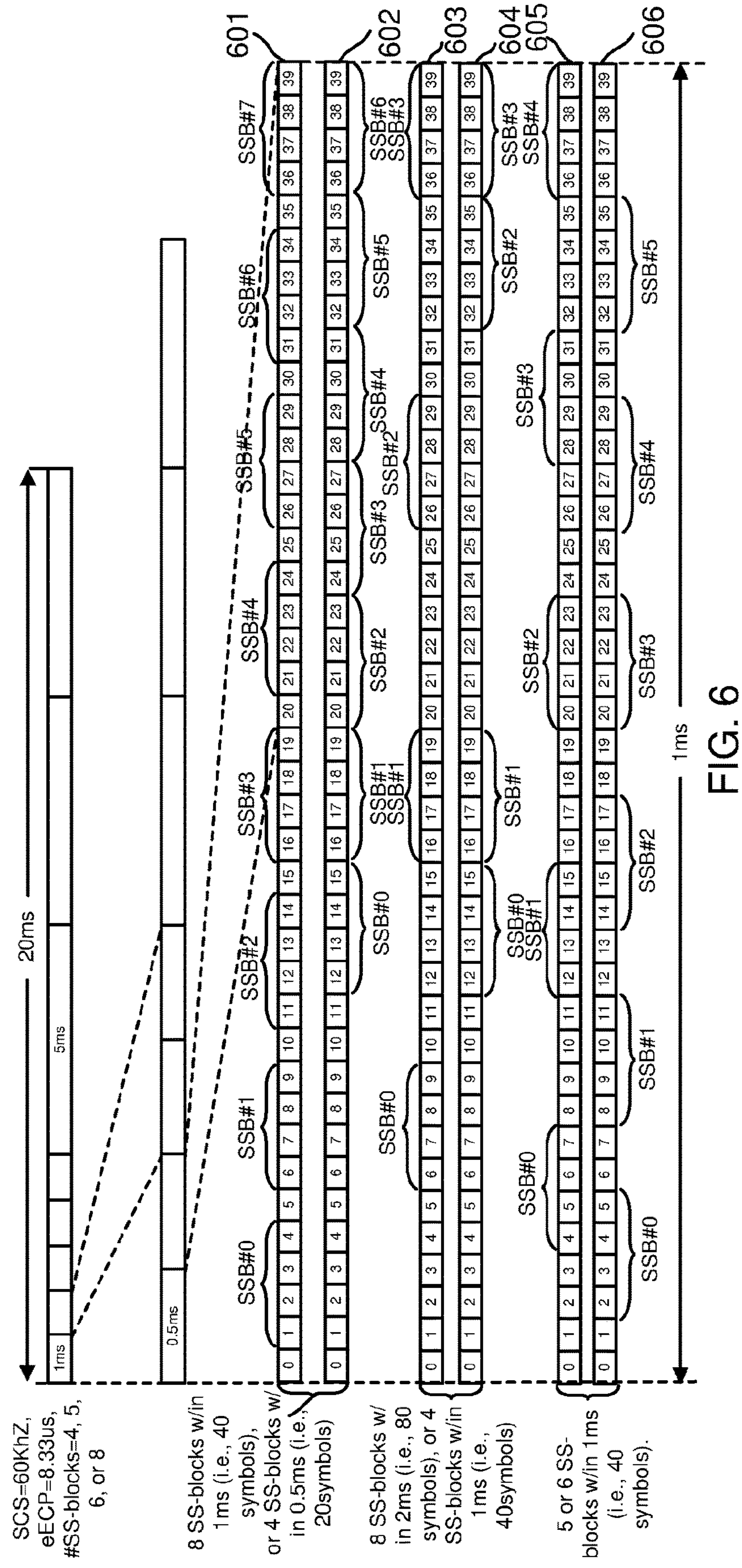
FIG. 6 is an illustration of example time domain locations for SSBs according to some aspects of the present disclosure.

FIG. 6 is an illustration of example TD locations for SSBs, according to various implementations. In the example of FIG. 6, the TD locations may be adopted in both FDD and TDD applications.

As noted above, for numerologies comprising a large subcarrier spacing (e.g., 60 kHz or greater) as well as a relatively large CP length (e.g., 8 μs or greater), new SSB TD locations and SSB structures are desirable. Accordingly, the TD locations of FIG. 6 are new and may be appropriate to use with non-traditional numerologies, such as the one labeled 2 eECP in FIG. 4. In the example of FIG. 6 (and in FIG. 7 as well) there are 10 symbols per slot, and 40 symbols in 1 ms.

Each of the different rows 601-606 represents a different first set configuration. Looking at row 601 first, it has eight SSBs within 1 ms or 40 symbols. Each SSB spans four symbols, and in row 601, the SSBs are located at symbol indexes 1-4, 6-9, 11-14, 16-19, 21-24, 26-29, 31-34, and 36-39. Row 602 can fit as many as four SSBs within 0.5 ms or 20 symbols. In the example of row 602, the SSBs of the burst set are at symbol indexes 12-15, 16-19, 20-23, 24-27, 28-31, 32-35, and 36-39.

Row 603 includes eight SSBs within 2 ms or 80 symbols. The SSBs are found at the symbol indexes 6-9, 16-19, 26-29, and 36-39, and then repeating onto an additional group of 40 indexes (not shown). Row 604 includes four SSBs within 1 ms or 40 symbols. The SSBs are at symbol indexes 12-15, 16-19, 32-35, and 36-39.

Various implementations also include burst set having five or six SSBs, as in rows 605-606. Looking at row 605, the SSBs are shown at symbol indexes 4-7, 12-15, 20-23, 28-31, and 36-39 (five SSBs within 1 ms). Row 606 includes six SSBs within 1 ms at symbol indexes 2-5, 8-11, 14-17, 20-23, 26-29, and 32-35.

Of course, the specific TD locations of FIG. 6 are for example, and it is understood that other implementations may locate SSBs at different symbol indexes.

Figure 7:
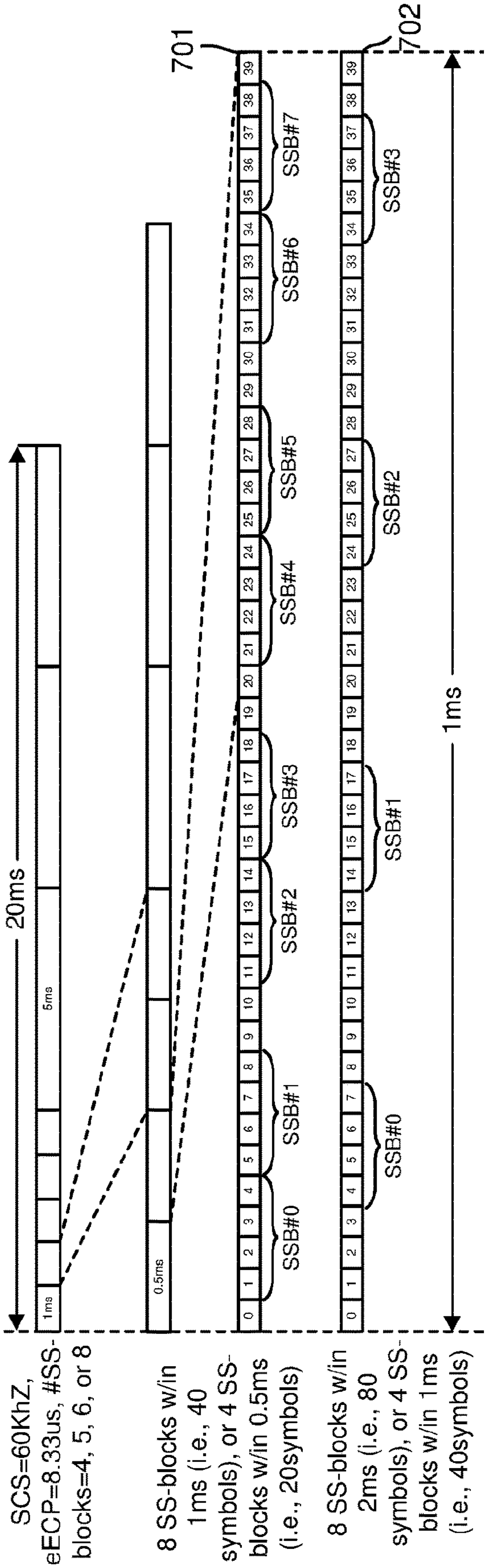
FIG. 7 is an illustration of example time domain locations for SSBs according to some aspects of the present disclosure.

FIG. 7 is an illustration of example TD locations for SSBs, according to various implementations. In the example of FIG. 7, the TD locations may be more adoptable for use in TDD applications than in FDD applications. Once again, the rows 701 and 702 include SSB burst set that may be used with a subcarrier spacing of 60 kHz, and extended prefix greater than 8 μs, and include a number of blocks such as 4/5/6/8.

In row 701, a burst set may include either eight SSBs within 1 ms or 40 symbols are for SSBs within 0.5 ms or 20 symbols. The SSBs are shown at symbol indexes 1-4, 5-8, 11-14, 15-18, 21-24, 25-28, 31-34, and 35-38. Row 702 illustrates that a burst set may include eight SSBs within 2 ms (80 symbols) are for SSBs within 1 ms (40 symbols). In the case of eight SSBs, the SSBs would be located at symbol indexes 4-7, 14-17, 24-27, and 34-37 and repeat with in a subsequent group of 40 symbols (not shown). In the case of four SSBs in a burst set, they would be located at symbol indexes 4-7, 14-17, 24-27, and 34-37.

As shown in FIGS. 6 and 7, if a burst set has 4, 5, or 6 SSBs, then it can be located within a 1 ms duration (40 symbols) if eight SSBs are in a burst set, they may be located within a 1 ms duration or a 2 ms duration (80 symbols). The inter-SSB interval in the time domain in the case of 2 ms duration can be greater than that of the case of the 1 ms duration. If only four SSBs are in a single burst set, they can be located within 0.5 ms duration (20 symbols).

In some TDD implementations, some symbol indexes may be left blank so that those indexes may be used for uplink opportunities. For instance, in FIG. 7 at row 701, symbol index 9 is left blank, and in row 702 symbols 8-9 are left blank. Thus, in these implementations later symbols in the slot are left blank in TDD systems, where as they might be used in FDD systems. For instance, in row 602 of FIG. 6, the various SSBs may be contiguous, though in FDD systems other frequencies may be used for uplink opportunities. Additionally, some implementations spread the burst set out over 2 ms, which leaves a greater inter-SSB interval in the time domain, where uplink resources may be placed within the inter-SSB interval. Another feature of some implementations is that TD locations of SSBs may be different for TDD versus FDD. For instance, row 603, as it represents a 2 ms burst set with eight SSBs or a 1 ms burst set having four SSBs, may be more appropriate for FDD applications because of the larger inter-symbol intervals.

An advantage of the TD locations shown in FIGS. 6-7 is that they provide flexibility for a designer to choose appropriate burst sets for different applications. For instance, some UEs may be preprogrammed to look for burst sets with the properties described above when operating in an ATG mode or otherwise using a non-traditional numerology. When TDD is preferred, a base station may use one of the example burst sets described above having smaller inter-symbol intervals and/or leaving later symbol indexes within a slot blank. By contrast, when FDD is preferred, base station may use other burst set with larger inter-symbol intervals. Similarly, a UE may be preprogrammed to look for such burst set based on whether FDD or TDD is preferred.

Figure 8:
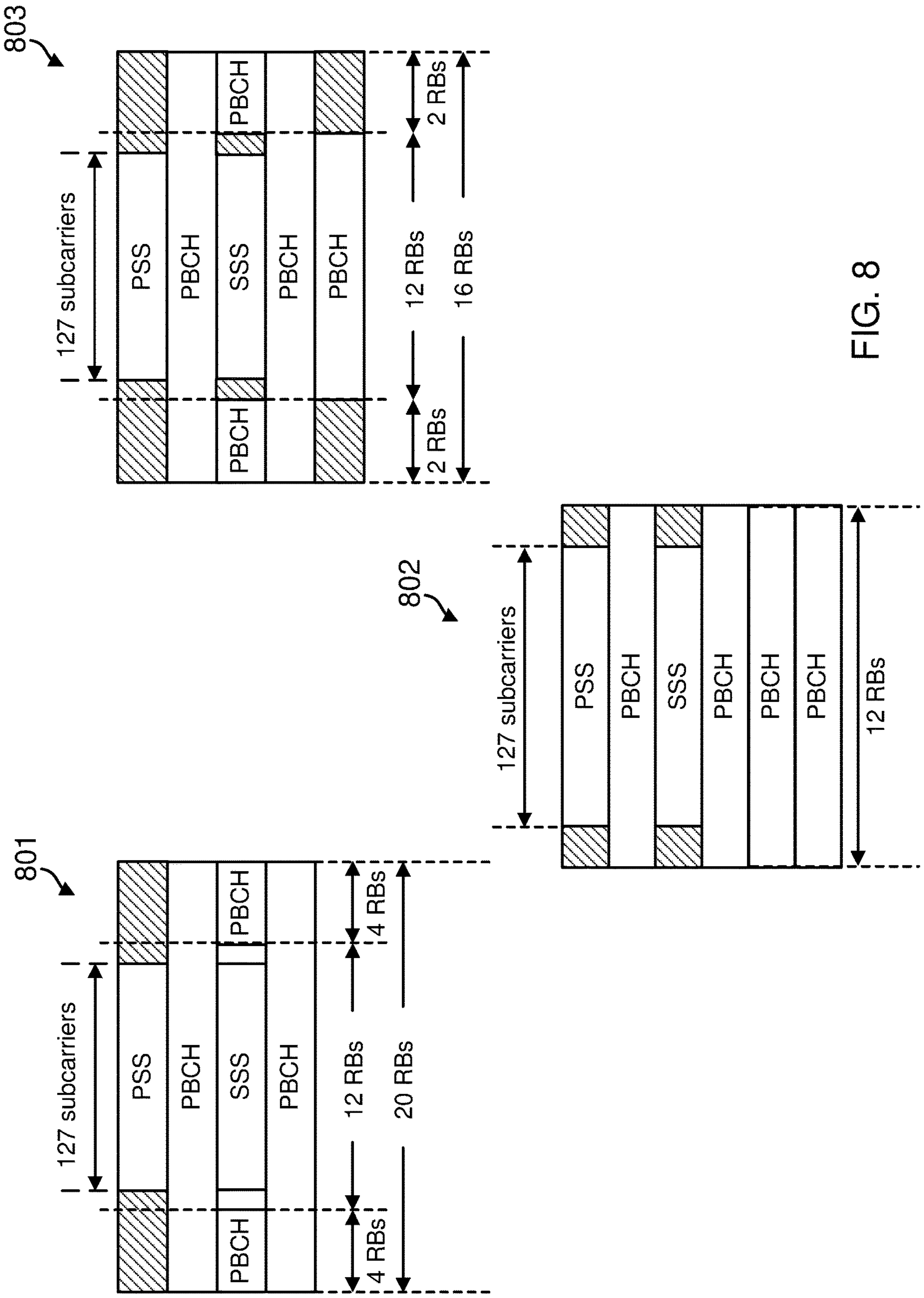
FIG. 8 is an illustration of example SSB structures according to some aspects of the present disclosure.

FIG. 8 is an illustration of example SSBs, some with reduced bandwidth, according to some implementations. SSB 801 is used with current standards. SSB 801 is transmitted on four symbols over 20 resource blocks (RBs). However, if SSB 801 was used with a numerology with 60 kHz subcarrier spacing, then it may be difficult to multiplex more SSBs within the same bandwidth in the frequency domain. It would be beneficial in some instances to reduce the bandwidth of the SSBs to allow for more frequency space between the SSBs as well as to allow for more flexibility in PDSCH scheduling.

SSBs 802 and 803 have reduced bandwidth compared to SSB 801. Specifically, SSB 802 only spans 16 RBs, but it is increased in the time domain by occupying five symbols instead of four. As a result, the bandwidth is 11.52 MHz. Similarly, SSB 803 only spans 12 RBs, but it is increased in the time domain by occupying six symbols instead of four. The bandwidth is 8.64 MHz. In the example of SSB 802, the bandwidth is reduced by locating the PBCH in four symbols, and in the example of SSB 803, the bandwidth is reduced by locating the PBCH in five symbols. In either case, the time domain properties of the PSS and SSS may remain the same as in a traditional SSB.

Reducing the bandwidth of the SSB might cause larger transition band slopes, especially for the PSS portion. Accordingly, UEs may include increased filtering capabilities to properly handle the transition band slopes. Some implementations may include a base station informing the UE to increase its filtering in response to using reduced-bandwidth SSBs.

Some UEs may be pre-programmed to identify SSBs having the time domain and frequency domain characteristics of FIG. 8. For instance, when a UE accesses a frequency band having a non-traditional numerology (e.g., 60 kHz subcarrier spacing and CP greater than 8 μs), it may be programmed to then as a default attempt to identify reduced-bandwidth SSBs, such as 802, 803. Similarly, the decision to attempt to identify reduced-bandwidth SSBs may be based on knowledge of the type of UE itself (e.g., an ATG UE type) or identifying the base station as an ATG base station. Also, while the particular TD and FD characteristics of SSBs 802, 803 are provided herein, it is understood that they are examples. The scope of implementations may include any appropriate reduced-bandwidth structure that reduces a number of RBs and SSB. Furthermore, the scope of embodiments may include any appropriate SSB structure that increases a number of symbols.

A possible advantage of the implementations of SSBs 802 and 803 is that the reduced bandwidth may allow for frequency division multiplexing more SSBs in one component carrier, and it may relax some frequency domain scheduling limitations on the downlink, such as for PDSCH.

Figure 9:
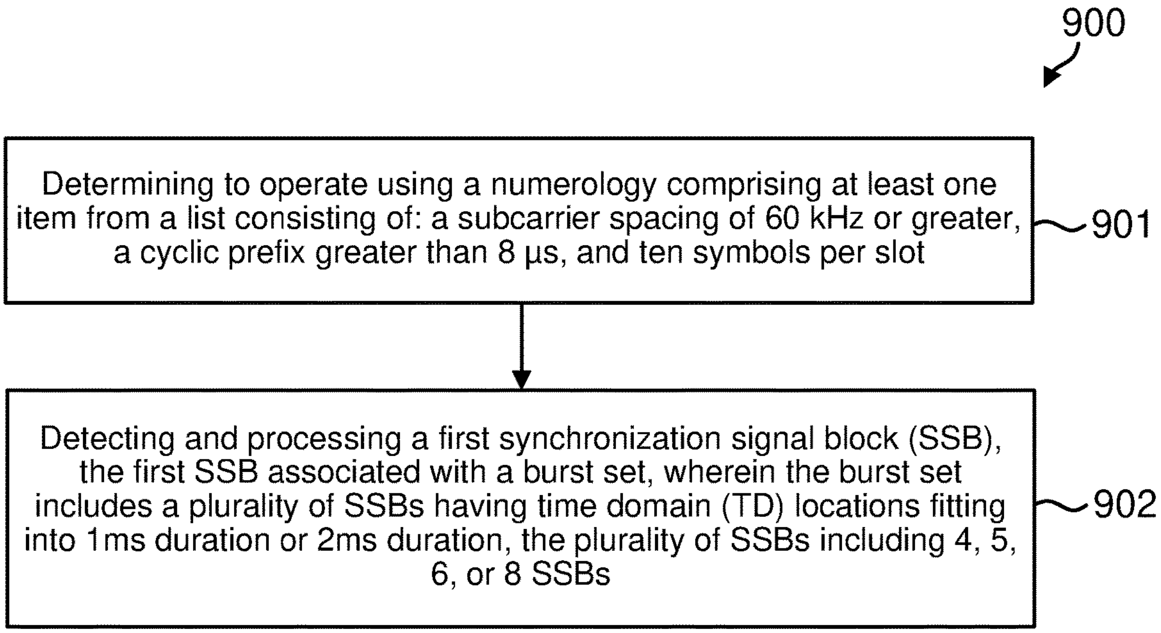
FIG. 9 is an illustration of an example method according to some aspects of the present disclosure.

FIG. 9 is an illustration of an example method 900 for handling SSBs. Method 900 may be performed by a UE, such as any of the UEs 115 of FIGS. 1 and 5. For instance, the UE may be a terrestrial UE or an ATG UE. The actions of method 900 are performed as the UE communicates with the BS, which may be any of the B Ss 105 of FIGS. 1 and 5.

At action 901, the UE determines to operate using a numerology that is nontraditional. For instance, the numerology may include a subcarrier spacing of 60 kHz or greater, a cyclic prefix (CP) greater than 8 μs, and/or using 10 symbols per slot. An example of such a nontraditional numerology is 2eECP in FIG. 4. However, the scope of embodiments may include any numerology having one or more of (but not necessarily all of) the following properties: a subcarrier spacing of 60 kHz or greater, a CP greater than 8 μs, and 10 symbols per slot.

The UE may determine to operate using that numerology based on any of a number of factors. For instance, the UE may be preprogrammed to operate in an air to ground (ATG) mode, where using a nontraditional numerology is a default. The determination to operate using the numerology may also be based at least in part on determining that a base station transmitting the SSB is an ATG base station. The determination that the UE is to operate in an ATG mode may be a static configuration of the UE. For example, the UE may be designated as such when the UE is initially configured and the UE may determine to run in an ATG mode by reading the configuration from memory. In other aspects, the determination that the UE is to run in an ATG mode may be determined more dynamically, for example based on a configuration from a BS, or a determination based on a characteristic such as a GPS reading. The UE may communicate with a BS to receive a message comprising information indicating that the UE is an aircraft UE and should operate in an ATG mode. The UE may, in some aspects, communicate with a GPS module of the UE to determine an altitude, and determine to operate in an ATG mode when the UE is above a threshold altitude. In some aspects, the determination to operate in an ATG mode for the purposes of the method may change over time, for example if the UE is on an aircraft, whether the UE operates in an ATG mode may change depending on whether the aircraft is on the ground or at a certain altitude.

At action 902, the UE detects and processes a first SSB. In this example, the first SSB is associated with a burst set that includes a plurality of SSBs having TD locations fitting into a 1 ms duration or a 2 ms duration and including 4, 5, 6, or 8 SSBs. Examples of such TD locations are found at FIGS. 6-7. In an example use case, the UE is pre-programmed to be able to detect and process a first SSB having any one or a combination of the following properties: the burst set being within a 1 ms duration ready to millisecond duration and 4, 5, 6, 8 SSBs in the burst set. For instance, the burst set may include eight SSBs per a 2 ms duration (80 symbols) are over a 1 ms duration (40 symbols), four SSBs over 20 symbols are over 40 symbols, or either five or six SSBs over 40 symbols.

Furthermore, the UE may be preprogrammed to operate in either a TDD mode or an FDD mode. In such case, some TD SSB locations may be associated with a TDD mode and other TD SSB locations may be associated with an FDD mode. For instance, when operating in an FDD mode, the UE may detect and process burst sets with larger inter-symbol intervals or may detect and process burst sets that avoid end symbols in the slots when operating in a TDD mode.

The scope of implementations is not limited to the specific actions described above. Rather, other embodiments may add, omit, rearrange, or modify any of the actions described above. For instance, method 900 may be performed at power up, during initial access, or during mobility operations. Method 900 may be repeated as appropriate.

Figure 10:
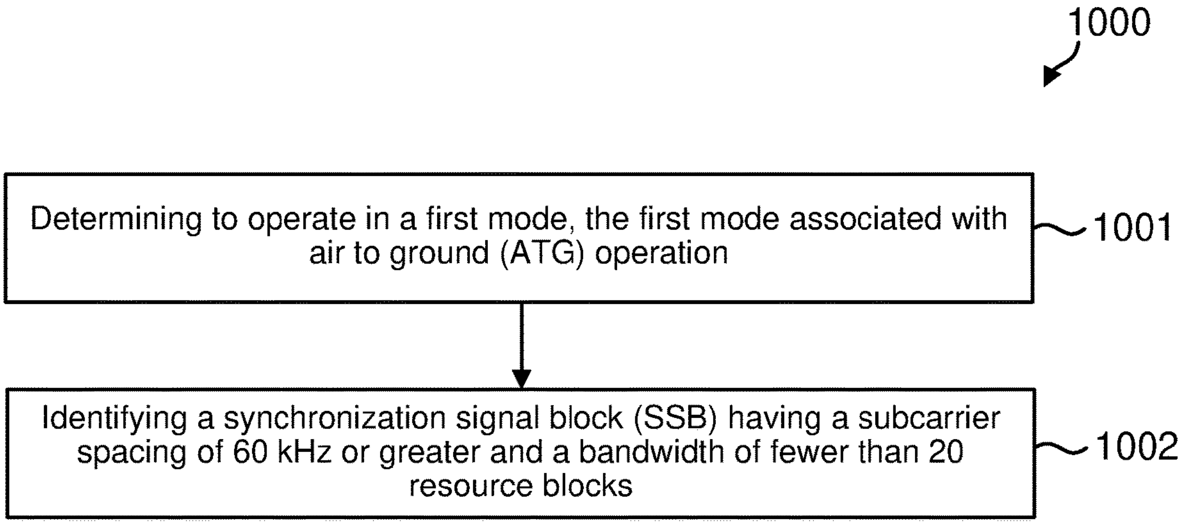
FIG. 10 is an illustration of an example method according to some aspects of the present disclosure.

FIG. 10 is an illustration of an example method 1000 for identifying and processing lower-bandwidth SSBs. Method 1000 may be performed by a UE, such as any of the UEs 115 of FIGS. 1 and 5. For instance, the UE may be a terrestrial UE or an ATG UE. The actions of method 1000 are performed as the UE communicates with the BS, which may be any of the BSs 105 of FIGS. 1 and 5.

At action 1001, the UE determines to operate in a first mode. In this example, the first mode includes an air to ground mode. The UE may determine to operate in the air to ground mode based on any appropriate condition. In one example, the UE determines to operate in the air to ground mode based on its identity as an ATG UE, where it is preprogrammed to operate in an ATG mode as a default. Additionally, or alternatively, the UE may determine to operate in the air to ground mode based on determining that the base station is an ATG base station. Further in this example, the ATG mode may include operating according to a nontraditional numerology. Examples of nontraditional numerologies are given in FIG. 4, with one specific example including a subcarrier spacing of 60 kHz and a CP greater than 8 μs.

The determination that the UE is to operate in an ATG mode may be a static configuration of the UE. For example the UE may be designated as such when the UE is initially configured and the UE may determine to run in an ATG mode by reading the configuration from memory. In other aspects, the determination that the UE is to run in an ATG mode may be determined more dynamically, for example based on a configuration from a BS, or a determination based on a characteristic such as a GPS reading. The UE may communicate with a BS to receive a message comprising information indicating that the UE is an aircraft UE and should operate in an ATG mode. The UE may, in some aspects, communicate with a GPS module of the UE to determine an altitude, and determine to operate in an ATG mode when the UE is above a threshold altitude. In some aspects, the determination to operate in an ATG mode for the purposes of the method may change over time, for example if the UE is on an aircraft, whether the UE operates in an ATG mode may change depending on whether the aircraft is on the ground or at a certain altitude.

At action 1002, the UE identifies an SSB having a subcarrier spacing of 60 kHz or greater and a bandwidth of fewer than 20 resource blocks. Examples of such SSBs are found in FIG. 8, which provides example SSBs 802, 803 in which bandwidth is limited while a number of symbols is increased. In the example of SSB 802, the bandwidth is reduced to 16 RBs, and in the example of SSB 803, the bandwidth is reduced to 12 RBs. In SSB 802, the PBCH is located over four symbols, and in SSB 802, the PBCH is located over five symbols. Thus, a reduction in bandwidth is accompanied by an increase in the time domain footprint. Furthermore, in these examples, the PSS and SSS may remain the same as in traditional SSBs.

The scope of implementations is not limited to the particular examples provided at actions 1001-1002, as other embodiments may add, omit, rearrange, or modify one or more the actions. For instance, method 1000 may be performed at power up, during initial access, and during mobility operations and may be repeated as appropriate.

Various implementations may include one or more advantages. For instance, some implementations may facilitate the use of non-traditional numerologies in ATG applications. ATG applications may benefit from the nontraditional numerologies because of Doppler effect in timing alignment issues, as discussed in more detail above. For instance, a numerology using CP greater than 8 μs may provide beneficial trade-offs in terms of timing alignment and Doppler robustness when compared to other traditional numerologies. Various implementations herein provide techniques to implement such numerologies within operating applications. For instance, the examples of FIGS. 6-7 and will nine provide time domain locations for SSBs in burst sets, where those burst sets may accommodate a nontraditional numerology that, e.g., includes 10 symbols per slot. Additionally, the examples of FIGS. 8 and 10 provide techniques that may be used to reduce a bandwidth of SSBs, which may be beneficial when a relatively large (e.g., 60 kHz) subcarrier spacing is used. The examples of FIGS. 8 and 10 may allow for more SSBs to be multiplexed within the frequency domain and may also allow for more scheduling flexibility for the PDSCH due to a reduced usage of bandwidth by the SSBs.

Figure 11:
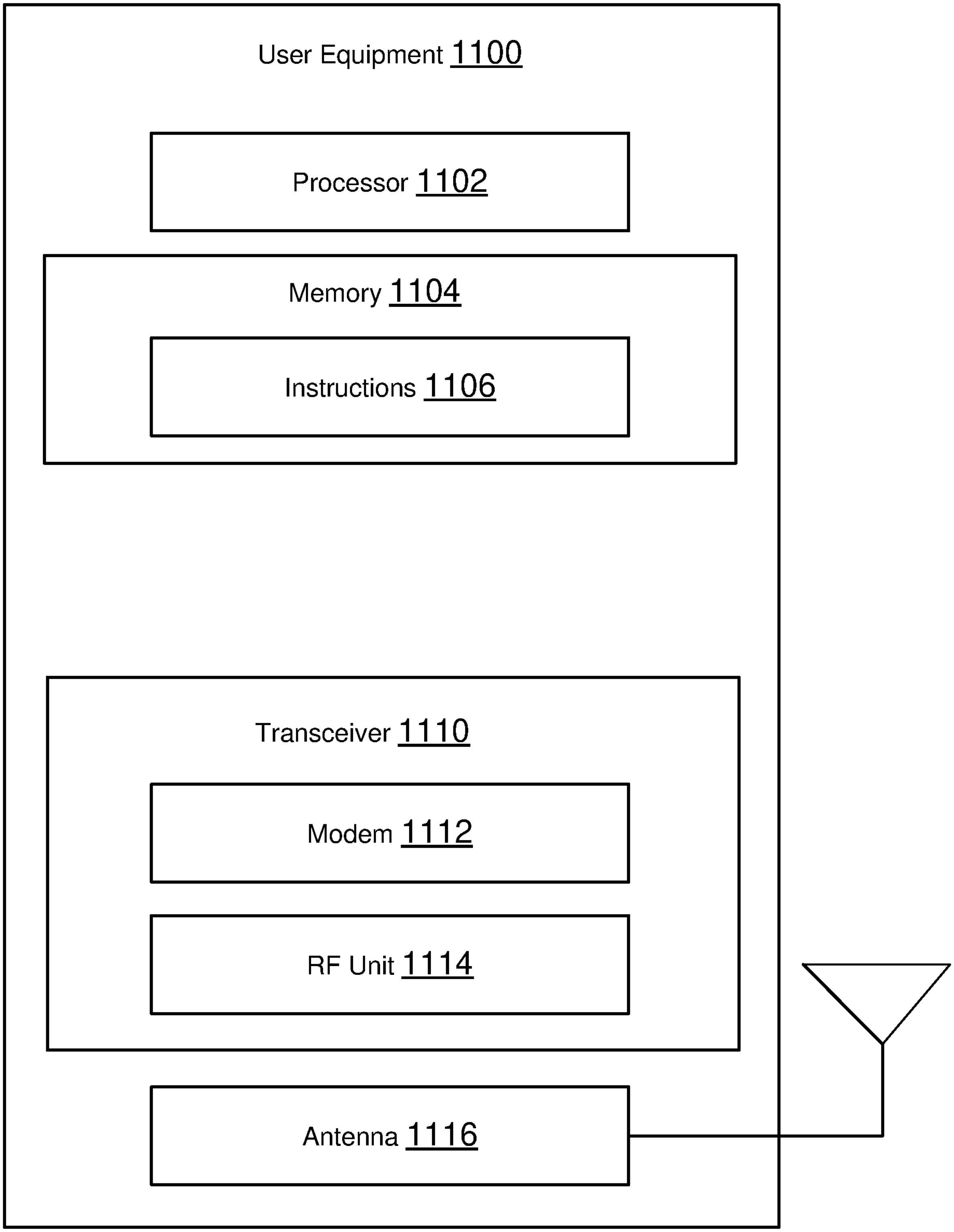
FIG. 11 is a block diagram of a user equipment (UE) according to some aspects of the present disclosure.

FIG. 11 is a block diagram of an exemplary UE 1100 according to some aspects of the present disclosure. The UE 1100 may be a UE 115 discussed above in FIGS. 1 and 5. As shown, the UE 1100 may include a processor 1102, a memory 1104, a transceiver 1110 including a modem subsystem 1112 and a radio frequency (RF) unit 1114, and one or more antennas 1116. These elements may be in direct or indirect communication with each other, for example via one or more buses.

The processor 1102 may include a central processing unit (CPU), a digital signal processor (DSP), an application specific integrated circuit (ASIC), a controller, a field programmable gate array (FPGA) device, another hardware device, a firmware device, or any combination thereof configured to perform the operations described herein. The processor 1102 may also be implemented as a combination of computing devices, e.g., a combination of a DSP and a microprocessor, a plurality of microprocessors, one or more microprocessors in conjunction with a DSP core, or any other such configuration.

The memory 1104 may include a cache memory (e.g., a cache memory of the processor 1102), random access memory (RAM), magnetoresistive RAM (MRAM), read-only memory (ROM), programmable read-only memory (PROM), erasable programmable read only memory (EPROM), electrically erasable programmable read only memory (EEPROM), flash memory, solid state memory device, hard disk drives, other forms of volatile and non-volatile memory, or a combination of different types of memory. For instance, memory 1104 may code that includes information indicating that that the UE is a ATG UE or that the UE should as a default operate in an ATG mode, including using a nontraditional numerology.

In an aspect, the memory 1104 includes a non-transitory computer-readable medium. The memory 1104 may store, or have recorded thereon, instructions 1106. The instructions 1106 may include instructions that, when executed by the processor 1102, cause the processor 1102 to perform the operations described herein with reference to the UEs 115 in connection with aspects of the present disclosure, for example, aspects of FIGS. 1-10. Instructions 1106 may also be referred to as program code. The program code may be for causing a wireless communication device to perform these operations, for example by causing one or more processors (such as processor 1102) to control or command the wireless communication device to do so. The terms "instructions" and "code" should be interpreted broadly to include any type of computer-readable statement(s). For example, the terms "instructions" and "code" may refer to one or more programs, routines, sub-routines, functions, procedures, etc. "Instructions" and "code" may include a single computer-readable statement or many computer-readable statements.

As shown, the transceiver 1110 may include the modem subsystem 1112 and the RF unit 1114. The transceiver 1110 can be configured to communicate bi-directionally with other devices, such as the BSs 105. The modem subsystem 1112 may be configured to modulate and/or encode the data from the memory 1104 according to a modulation and coding scheme (MCS), e.g., a low-density parity check (LDPC) coding scheme, a turbo coding scheme, a convolutional coding scheme, a digital beamforming scheme, etc. The RF unit 1114 may be configured to process (e.g., perform analog to digital conversion or digital to analog conversion, etc.) modulated/encoded data from the modem subsystem 1112 (on outbound transmissions) or of transmissions originating from another source such as a UE 115 or a BS 105. The RF unit 1114 may be further configured to perform analog beamforming in conjunction with the digital beamforming. Although shown as integrated together in transceiver 1110, the modem subsystem 1112 and the RF unit 1114 may be separate devices that are coupled together at the UE 115 to enable the UE 115 to communicate with other devices.

The RF unit 1114 may provide the modulated and/or processed data, e.g. data packets (or, more generally, data messages that may contain one or more data packets and other information), to the antennas 1116 for transmission to one or more other devices. The antennas 1116 may further receive data messages transmitted from other devices. The antennas 1116 may provide the received data messages for processing and/or demodulation at the transceiver 1110. The transceiver 1110 may provide the demodulated and decoded data to the processor 1102 processing. The antennas 1116 may include multiple antennas of similar or different designs in order to sustain multiple transmission links. The RF unit 1114 may configure the antennas 1116.

In an aspect, the UE 1100 can include multiple transceivers 1110 implementing different RATs (e.g., NR and LTE). In an aspect, the UE 1100 can include a single transceiver 1110 implementing multiple RATs (e.g., NR and LTE). In an aspect, the transceiver 1110 can include various components, where different combinations of components can implement different RATs.

Figure 12:
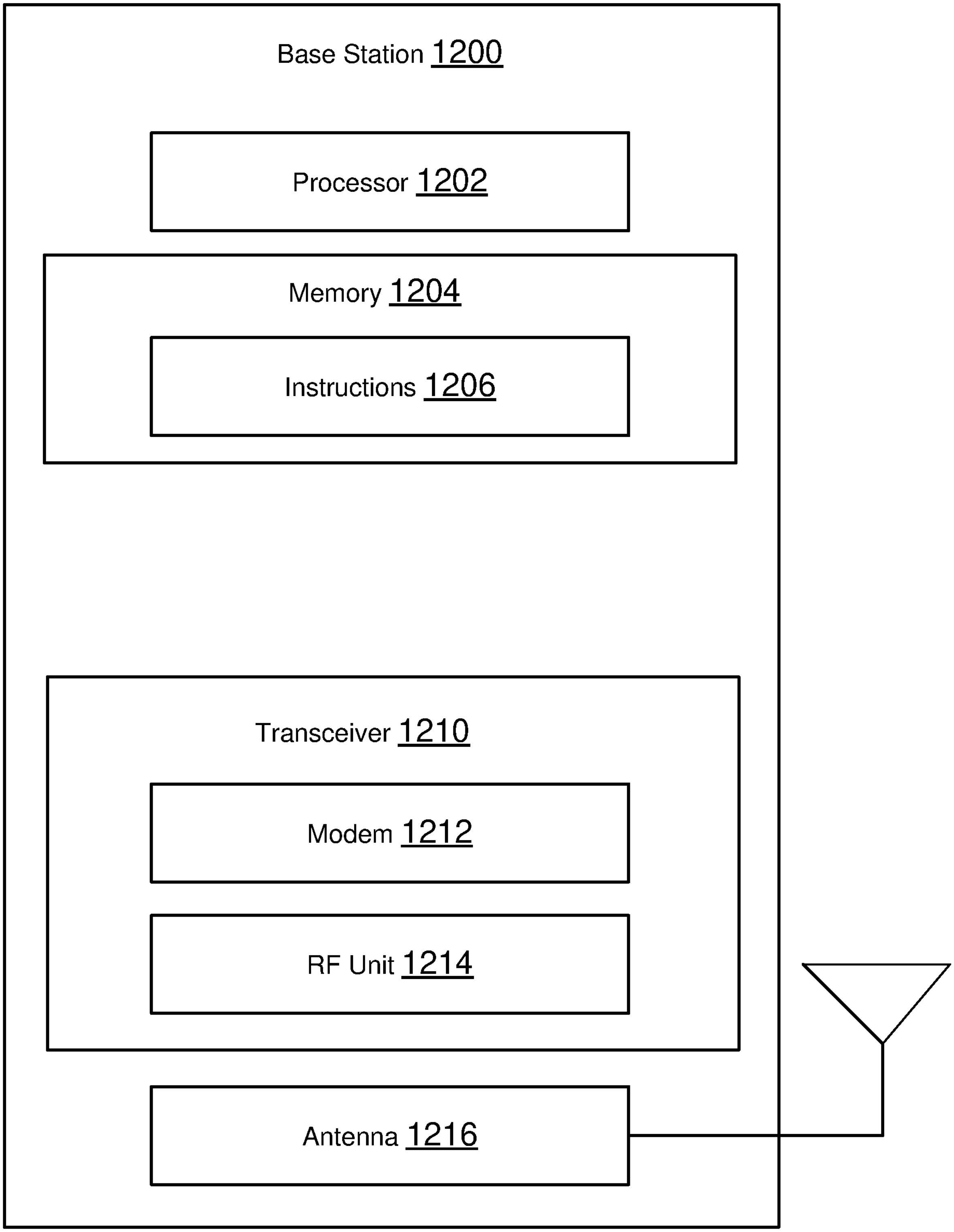
FIG. 12 is a block diagram of an exemplary base station (BS) according to some aspects of the present disclosure.

FIG. 12 is a block diagram of an exemplary BS 1200 according to some aspects of the present disclosure. The BS 1200 may be a BS 105 in the network 100 as discussed above in FIGS. 1 and 5. A shown, the BS 1200 may include a processor 1202, a memory 1204, a transceiver 1210 including a modem subsystem 1212 and a RF unit 1214, and one or more antennas 1216. These elements may be in direct or indirect communication with each other, for example via one or more buses.

The processor 1202 may have various features as a specific-type processor. For example, these may include a CPU, a DSP, an ASIC, a controller, a FPGA device, another hardware device, a firmware device, or any combination thereof configured to perform the operations described herein. The processor 1202 may also be implemented as a combination of computing devices, e.g., a combination of a DSP and a microprocessor, a plurality of microprocessors, one or more microprocessors in conjunction with a DSP core, or any other such configuration.

The memory 1204 may include a cache memory (e.g., a cache memory of the processor 1202), RAM, MRAM, ROM, PROM, EPROM, EEPROM, flash memory, a solid state memory device, one or more hard disk drives, memristor-based arrays, other forms of volatile and non-volatile memory, or a combination of different types of memory. In some aspects, the memory 1204 may include a non-transitory computer-readable medium. The memory 1204 may store instructions 1206. The instructions 1206 may include instructions that, when executed by the processor 1202, cause the processor 1202 to cause the other components of the base station 1200 to communicate with the UE 1100, such as by transmitting SSBs, configurations, and the like, and actions described above with respect to FIGS. 1-10. Instructions 1206 may also be referred to as code, which may be interpreted broadly to include any type of computer-readable statement(s) as discussed above with respect to FIG. 11.

As shown, the transceiver 1210 may include the modem subsystem 1212 and the RF unit 1214. The transceiver 1210 can be configured to communicate bi-directionally with other devices, such as the UEs 115 and/or another core network element. The modem subsystem 1212 may be configured to modulate and/or encode data according to a MCS, e.g., a LDPC coding scheme, a turbo coding scheme, a convolutional coding scheme, a digital beamforming scheme, etc. The RF unit 1214 may be configured to process (e.g., perform analog to digital conversion or digital to analog conversion, etc.) modulated/encoded data (e.g., SSBs, RMSI, MIB, SIB, frame based equipment—FBE configuration, PRACH configuration PDCCH, PDSCH) from the modem subsystem 1212 (on outbound transmissions) or of transmissions originating from another source such as a UE 115, the node 315, and/or BS 1200. The RF unit 1214 may be further configured to perform analog beamforming in conjunction with the digital beamforming. Although shown as integrated together in transceiver 1210, the modem subsystem 1212 and/or the RF unit 1214 may be separate devices that are coupled together at the BS 105 to enable the BS 105 to communicate with other devices.

The RF unit 1214 may provide the modulated and/or processed data, e.g. data packets (or, more generally, data messages that may contain one or more data packets and other information), to the antennas 1216 for transmission to one or more other devices. The antennas 1216 may be similar to the antennas of the BS 105 discussed above. This may include, for example, transmission of information to complete attachment to a network and communication with a camped UE 115 according to some aspects of the present disclosure. The antennas 1216 may further receive data messages transmitted from other devices and provide the received data messages for processing and/or demodulation at the transceiver 1210. The transceiver 1210 may provide the demodulated and decoded data (e.g., PUCCH control information, PRACH signals, PUSCH data) to the processor 1202 for processing. The antennas 1216 may include multiple antennas of similar or different designs in order to sustain multiple transmission links.

In an aspect, the BS 1200 can include multiple transceivers 1210 implementing different RATs (e.g., NR and LTE). In an aspect, the BS 1200 can include a single transceiver 1210 implementing multiple RATs (e.g., NR and LTE). In an aspect, the transceiver 1210 can include various components, where different combinations of components can implement different RATs.

The various illustrative blocks and modules described in connection with the disclosure herein may be implemented or performed with a general-purpose processor, a DSP, an ASIC, an FPGA or other programmable logic device, discrete gate or transistor logic, discrete hardware components, or any combination thereof designed to perform the functions described herein. A general-purpose processor may be a microprocessor, but in the alternative, the processor may be any conventional processor, controller, microcontroller, or state machine. A processor may also be implemented as a combination of computing devices (e.g., a combination of a DSP and a microprocessor, multiple microprocessors, one or more microprocessors in conjunction with a DSP core, or any other such configuration).

The functions described herein may be implemented in hardware, software executed by a processor, firmware, or any combination thereof. If implemented in software executed by a processor, the functions may be stored on or transmitted over as one or more instructions or code on a computer-readable medium. Other examples and implementations are within the scope of the disclosure and appended claims. For example, due to the nature of software, functions described above can be implemented using software executed by a processor, hardware, firmware, hardwiring, or combinations of any of these. Features implementing functions may also be physically located at various positions, including being distributed such that portions of functions are implemented at different physical locations. Also, as used herein, including in the claims, "or" as used in a list of items (for example, a list of items prefaced by a phrase such as "at least one of" or "one or more of") indicates an inclusive list such that, for example, a list of [at least one of A, B, or C] means A or B or C or AB or AC or BC or ABC (i.e., A and B and C).

As those of some skill in this art will by now appreciate and depending on the particular application at hand, many modifications, substitutions and variations can be made in and to the materials, apparatus, configurations and methods of use of the devices of the present disclosure without departing from the spirit and scope thereof. In light of this, the scope of the present disclosure should not be limited to that of the particular implementations illustrated and described herein, as they are merely by way of some examples thereof, but rather, should be fully commensurate with that of the claims appended hereafter and their functional equivalents.

Implementation examples are described in the following numbered clauses:

1. A method performed by a user equipment (UE), the method comprising:
   determining to operate using a numerology comprising at least one item from a list consisting of: a subcarrier spacing of 60 kHz or greater, a cyclic prefix greater than 8 μs, and ten symbols per slot; and
   detecting and processing a first synchronization signal block (SSB), the first SSB associated with a burst set, wherein the burst set includes a plurality of SSBs having time domain (TD) locations fitting into 1 ms duration or 2 ms duration, the plurality of SSBs including 4, 5, 6, or 8 SSBs.
2. The method of clause 1, wherein the burst set spans a plurality of slots, further wherein the burst set avoids symbols at ends of each slot.
3. The method of clauses 1-2, wherein the UE comprises an air to ground (ATG) UE.
4. The method of clauses 1-3, wherein the burst set includes eight SSBs per a 2 ms duration.
5. The method of clauses 1-3, wherein the burst set includes five SSBs per 1 ms.
6. The method of clauses 1-3, wherein the burst set includes six SSBs per 1 ms.
7. The method of clauses 1-6, wherein determining to operate using the numerology is based at least in part on determining to operate in an air to ground (ATG) mode.
8. The method of clauses 1-7, wherein determining to operate using the numerology is based at least in part on determining that a base station transmitting the SSB is an air to ground (ATG) base station.

9. A non-transitory computer-readable medium having program code recorded thereon, the program code comprising:

code for determining to operate in a first mode, the first mode associated with air to ground (ATG) operation; and code for identifying a synchronization signal block (SSB) having a subcarrier spacing of 60 kHz or greater and a bandwidth of fewer than 20 resource blocks in response to operating in the first mode.

10. The non-transitory computer-readable medium of clause 9, wherein each SSB includes fewer than 16 resource blocks (RBs).

11. The non-transitory computer-readable medium of clauses 9-10, wherein each SSB includes no more than 12 resource blocks (RBs).

12. The non-transitory computer-readable medium of clauses 9-11, wherein the SSB includes five symbols.

13. The non-transitory computer-readable medium of clauses 9-12, wherein the SSB includes six symbols.

14. The non-transitory computer-readable medium of clauses 9-13, further comprising:

code for increasing filtering for transition band slopes in response to receiving an instruction from a base station transmitting the SSB.

15. The non-transitory computer-readable medium of clauses 9-14, further comprising:

code for increasing filtering for transition band slopes in response to determining that the SSB comprises a reduced-bandwidth SSB.

16. The non-transitory computer-readable medium of clauses 9-15, wherein determining to operate in the first mode is based at least in part on determining that a base station transmitting the SSB is an air to ground (ATG) base station.

17. The non-transitory computer-readable medium of clauses 9-16, wherein a physical broadcast channel (PBCH) of the SSB is located in four symbols.

18. The non-transitory computer-readable medium of clauses 9-16, wherein a physical broadcast channel (PBCH) of the SSB is located in five symbols.

19. The non-transitory computer-readable medium of clauses 9-18, wherein the first mode comprises using a numerology having 60 kHz subcarrier spacing and a cyclic prefix greater than 8 μs.

20. A user equipment (UE) comprising:

a transceiver; and a processor configured to control the transceiver, the processor further configured to:

operate using a numerology comprising at least one item from a list consisting of: a subcarrier spacing of 60 kHz or greater, a cyclic prefix greater than 8 μs, and ten symbols per slot; and detect and process a first synchronization signal block (SSB), the first SSB associated with a burst set, wherein the burst set includes a plurality of SSBs having time domain (TD) locations fitting into 1 ms duration or 2 ms duration, the plurality of SSBs including 4, 5, 6, or 8 SSBs.

21. The UE of clause 20, wherein the UE comprises an air to ground (ATG) UE implemented in an aircraft.

22. The UE of clauses 20-21, wherein the processor is further configured to determine to operate using the numerology based at least in part on determining that a base station transmitting the SSB is an air to ground (ATG) base station.

23. The UE of clauses 20-22, wherein the processor is further configured to determine to operate using the numerology based at least in part on determining that the UE is operating in an air to ground (ATG) mode.

24. The UE of clauses 20-23, wherein the processor is configured to detect and process the SSB within the burst set having eight SSBs per 80 symbols.

25. The UE of clauses 20-23, wherein the processor is configured to detect and process the SSB within the burst set having five SSBs per 40 symbols.

26. The UE of clauses 20-25, wherein the burst set spans a plurality of slots, further wherein the burst set avoids symbols at ends of each slot, and wherein the processor is configured to transmit uplink signals in the symbols at the ends of each slot.

27. A user equipment (UE) comprising:

means for operating in a first mode, the first mode associated with air to ground (ATG) operation; and means for identifying a synchronization signal block (SSB) having a subcarrier spacing of 60 kHz or greater and a bandwidth of fewer than 20 resource blocks in accordance with the first mode.

28. The UE of clause 27, further comprising:

means for increasing filtering for transition band slopes in response to receiving an instruction from a base station transmitting the SSB.

29. The UE of clauses 27-28, further comprising:

code for increasing filtering for transition band slopes in response to determining that the SSB comprises a reduced-bandwidth SSB.

30. The UE of clauses 27-29, further comprising:

means for determining to operate in the first mode based at least in part on determining that a base station transmitting the SSB is an air to ground (ATG) base station.

What is claimed is:

1. A user equipment (UE) comprising:

at least one transceiver;

at least one memory comprising instructions;

and at least one processor, the at least one processor configured to execute the instructions to cause the UE to:

operate using a numerology comprising at least one item from a list consisting of: a subcarrier spacing of 60 KHz or greater, a cyclic prefix greater than 8 μs, and ten symbols per slot;

detect, via the at least one transceiver, a synchronization signal block (SSB), the SSB associated with a burst set, wherein the burst set comprises 5 SSBs per 40 symbols, the 5 SSBs having time domain (TD) locations fitting into a 1 ms duration; and process the SSB.

2. The UE of claim 1, wherein the UE comprises an air to ground (ATG) UE implemented in an aircraft.

3. The UE of claim 1, wherein the at least one processor is further configured to cause the UE to determine to operate using the numerology based at least in part on determining that a base station transmitting the SSB is an air to ground (ATG) base station.

4. The UE of claim 1, wherein the at least one processor is further configured to cause the UE to determine to operate using the numerology based at least in part on determining that the UE is operating in an air to ground (ATG) mode.

5. The UE of claim 1, wherein the burst set spans a plurality of slots, wherein the burst set avoids symbols at ends of each slot, and wherein the at least one processor is further configured to cause the UE to transmit, via the at least one transceiver, uplink signals in the symbols at the ends of each slot.

6. A user equipment (UE) comprising:

at least one transceiver;

at least one memory comprising instructions; and at least one processor, the at least one processor configured to execute the instructions to cause the UE to:

operate using a numerology comprising at least one item from a list consisting of: a subcarrier spacing of 60 KHz or greater, a cyclic prefix greater than 8 μs, and ten symbols per slot;

detect, via the at least one transceiver, a synchronization signal block (SSB), the SSB associated with a burst set, wherein the burst set comprises 6 SSBs per 40 symbols, the 6 SSBs having time domain (TD) locations fitting into a 1 ms duration; and process the SSB.

7. The UE of claim 6, wherein the UE comprises an air to ground (ATG) UE implemented in an aircraft.

8. The UE of claim 6, wherein the at least one processor is further configured to cause the UE to determine to operate using the numerology based at least in part on determining that a base station transmitting the SSB is an air to ground (ATG) base station.

9. The UE of claim 6, wherein the at least one processor is further configured to cause the UE to determine to operate using the numerology based at least in part on determining that the UE is operating in an air to ground (ATG) mode.

10. The UE of claim 6, wherein the burst set spans a plurality of slots, wherein the burst set avoids symbols at ends of each slot, and wherein the at least one processor is further configured to cause the UE to transmit, via the at least one transceiver, uplink signals in the symbols at the ends of each slot.

11. A user equipment (UE) comprising:

at least one transceiver; and at least one memory comprising instructions; and the at least one processor configured to execute the instructions to cause the UE to:

operate using a numerology comprising at least one item from a list consisting of:

a subcarrier spacing of 60 KHz or greater, a cyclic prefix greater than 8 μs, and ten symbols per slot; and detect a synchronization signal block (SSB), the SSB associated with a burst set, wherein the burst set comprises 8 SSBs per 80 symbols, the 8 SSBs having time domain (TD) locations fitting into a 2 ms duration; and process the SSB.

12. The UE of claim 11, wherein the UE is configured to operate as an air to ground (ATG) UE.

13. The UE of claim 11, wherein the at least one processor is further configured to cause the UE to determine to operate using the numerology based at least in part on determining that a base station associated with the SSB is an air to ground (ATG) base station.

14. The UE of claim 11, wherein the at least one processor is further configured to cause the UE to determine to operate using the numerology based at least in part on determining that the UE is operating in an air to ground (ATG) mode.

15. The UE of claim 11, wherein:

the burst set spans a plurality of slots;

the burst set avoids symbols at ends of each slot; and the at least one processor is further configured to cause the UE to transmit, via the at least one transceiver, uplink signals in the symbols at the ends of each slot.

16. A user equipment (UE) comprising:

at least one transceiver; and at least one memory comprising instructions; and the at least one processor configured to execute the instructions to cause the UE to:

operate using a numerology comprising at least one item from a list consisting of:

a subcarrier spacing of 60 KHz or greater, a cyclic prefix greater than 8 ps, and ten symbols per slot; and detect a synchronization signal block (SSB), the SSB associated with a burst set, wherein the burst set comprises 5 SSBs per 40 symbols, the 5 SSBs having time domain (TD) locations fitting into a 1 ms duration; and process the SSB.

17. The UE of claim 16, wherein the UE is configured to operate as an air to ground (ATG) UE.

18. The UE of claim 16, wherein the at least one processor is further configured to cause the UE to determine to operate using the numerology based at least in part on determining that a base station associated with the SSB is an air to ground (ATG) base station.

19. The UE of claim 16, wherein the at least one processor is further configured to cause the UE to determine to operate using the numerology based at least in part on determining that the UE is operating in an air to ground (ATG) mode.

20. The UE of claim 16, wherein:

the burst set spans a plurality of slots;

the burst set avoids symbols at ends of each slot; and the at least one processor is further configured to cause the UE to transmit, via the at least one transceiver, uplink signals in the symbols at the ends of each slot.

* * * * *